US012097165B2

(12) United States Patent
Hunter et al.

(10) Patent No.: US 12,097,165 B2
(45) Date of Patent: Sep. 24, 2024

(54) FOOT FOR HANDS-FREE CRUTCH

(71) Applicant: iWalkFree, Inc., Long Beach, CA (US)

(72) Inventors: Bradly Hunter, Long Beach, CA (US); Wilson Steele, Huntington Beach, CA (US)

(73) Assignee: iWALKFree, Inc., Long Beach, CA (US)

( * ) Notice: Subject to any disclaimer, the term of this patent is extended or adjusted under 35 U.S.C. 154(b) by 0 days.

(21) Appl. No.: 18/094,253

(22) Filed: Jan. 6, 2023

(65) Prior Publication Data

US 2023/0218467 A1 Jul. 13, 2023

Related U.S. Application Data

(60) Provisional application No. 63/298,408, filed on Jan. 11, 2022, provisional application No. 63/297,205, filed on Jan. 6, 2022.

(51) Int. Cl.
*A61H 3/02* (2006.01)

(52) U.S. Cl.
CPC ......... *A61H 3/0288* (2013.01); *A61H 3/0277* (2013.01); *A61H 2003/0211* (2013.01)

(58) Field of Classification Search
CPC .............. A45B 9/04; A61H 2003/0211; A61H 3/0288; A61H 2003/005
See application file for complete search history.

(56) References Cited

U.S. PATENT DOCUMENTS

| | | | | |
|---|---|---|---|---|
| 5,331,989 | A * | 7/1994 | Stephens .................. | A61H 3/02 135/65 |
| 7,717,123 | B2 * | 5/2010 | Weber .................. | A61H 3/0277 135/65 |
| 8,778,031 | B1 | 7/2014 | Latour | |
| 9,408,443 | B2 | 8/2016 | Hunter | |
| 10,441,493 | B2 | 10/2019 | Adams | |
| 10,624,810 | B2 | 4/2020 | Hunter | |
| 2008/0163914 | A1 | 7/2008 | Weber et al. | |
| 2017/0156458 | A1 | 6/2017 | Hayden | |

FOREIGN PATENT DOCUMENTS

| | | | |
|---|---|---|---|
| KR | 1020110118055 | 10/2011 | |
| KR | 1020120089982 | 8/2012 | |
| KR | 1016306650000 | 6/2016 | |
| WO | WO-2007043379 A1 * | 4/2007 | .............. A61H 3/00 |

OTHER PUBLICATIONS

International Search Report and Written Opinion in International Application No. PCT/US2023/010350 dated Jun. 19, 2023, 12 pages.

* cited by examiner

*Primary Examiner* — Noah Chandler Hawk
(74) *Attorney, Agent, or Firm* — Fish IP Law, LLP; Tomas A. Prieto

(57) ABSTRACT

A foot for a crutch has a ground contact portion with a variable camber. The camber angle changes from at least one of a front edge or rear edge of the variable camber, to a maximum camber. In embodiments, the camber increases from the at least one of the front edge or rear edge to the maximum camber region, and then decreases to the other of the front edge or the rear edge. In embodiments, a foot can have two regions of different cambers laterally disposed from each other such that only one of the two regions contacts the ground during a step at any given time.

12 Claims, 35 Drawing Sheets

FOOT FOR HANDS-FREE CRUTCH

This application claims priority to U.S. provisional application 63/297,205, filed Jan. 6, 2022 and U.S. provisional application 63/298,408, filed Jan. 11, 2022. U.S. provisional applications 63/297,205 and 63/298,408 and all other extrinsic references contained herein are incorporated by reference in their entirety.

FIELD OF THE INVENTION

The field of the invention is hands-free crutches.

BACKGROUND

The background description includes information that may be useful in understanding the present invention. It is not an admission that any of the information provided herein is prior art or relevant to the presently claimed invention, or that any publication specifically or implicitly referenced is prior art.

In order to function properly, the foot of a hands-free crutch must have ground contact where, in the horizontal plane, the medial ground contact point is elevated relative to the lateral ground contact point. We refer to this vertical asymmetry as "camber."

If the foot does not have enough camber, the crutch will be unstable. If the foot has too much camber, then the efficiency and comfort of the crutch are compromised, as the crutch will impose a medial pushing force on the user. The optimal amount of camber does not remain consistent throughout the user's step.

Thus, there is still a need for a foot that provides an optimized balance of stability and comfort for the user throughout the step.

Walking with a hands-free crutch is often challenging to new users. Some users find it challenging to find the right balance at first while stepping with the crutch. Thus, there is still a need for a foot that assists users in learning to walk with a hands-free crutch.

SUMMARY OF THE INVENTION

The inventive subject matter provides apparatus, systems and methods in which a crutch foot has a ground contact portion with varying camber. The ground contact portion has a first camber angle and a second camber angle at a second portion, where the first angle is less than the second angle.

In embodiments of the inventive subject matter, the first portion having a lower camber angle is at a rear-edge portion of the ground contact portion (e.g., the heel-strike portion). In embodiments, the second portion having the second camber angle is between a front edge and rear edge of the ground contact portion. There can be a third portion having a camber angle that is less than the second camber angle. The third portion can be at a front portion of the ground contact portion (e.g., a toe-off portion).

In embodiments, the second camber angle is at or near a mid-point of the ground contact portion.

In embodiments, the lowest camber angle is at the heel/rear edge of the ground contact portion.

The inventive subject matter also provides apparatus, systems and methods whereby a crutch foot has sections of different cambers across the lateral cross section of the foot. In these embodiments, the ground contact portion of the foot has an inner and outer section arranged laterally, with the inner section having a different camber than the outer section.

When the crutch is properly used, only the inner section of the foot of these embodiments will come into contact with the ground. The outer section remains off the ground during the entire step, and only comes into contact with the ground if the user loses lateral balance.

The inventive subject matter also provides apparatus, systems and methods whereby the effects of a variable-camber foot can be provided to a foot that has a bottom surface with a constant camber. In these embodiments, the foot includes a pivoting element with a hinge fitting into a corresponding tube block. The angle of the hinge is not parallel to the ground, so as the rotates about the hinge, the tube block sweeps in an arc rather than perfectly circular. This arc causes a change in the off-vertical angle of the crutch.

The inventive subject matter further provides apparatus, systems and methods whereby a crutch foot has a tread of a variable durometer between the areas of lower camber and maximum camber. In these embodiments, the tread has a softer durometer at areas where the camber is lower and a stiffer durometer at the area of maximum camber. Thus, at the area of maximum camber, the tread is largely uncompressed.

Various objects, features, aspects and advantages of the inventive subject matter will become more apparent from the following detailed description of preferred embodiments, along with the accompanying drawing figures in which like numerals represent like components.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

DETAILED DESCRIPTION

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1A:
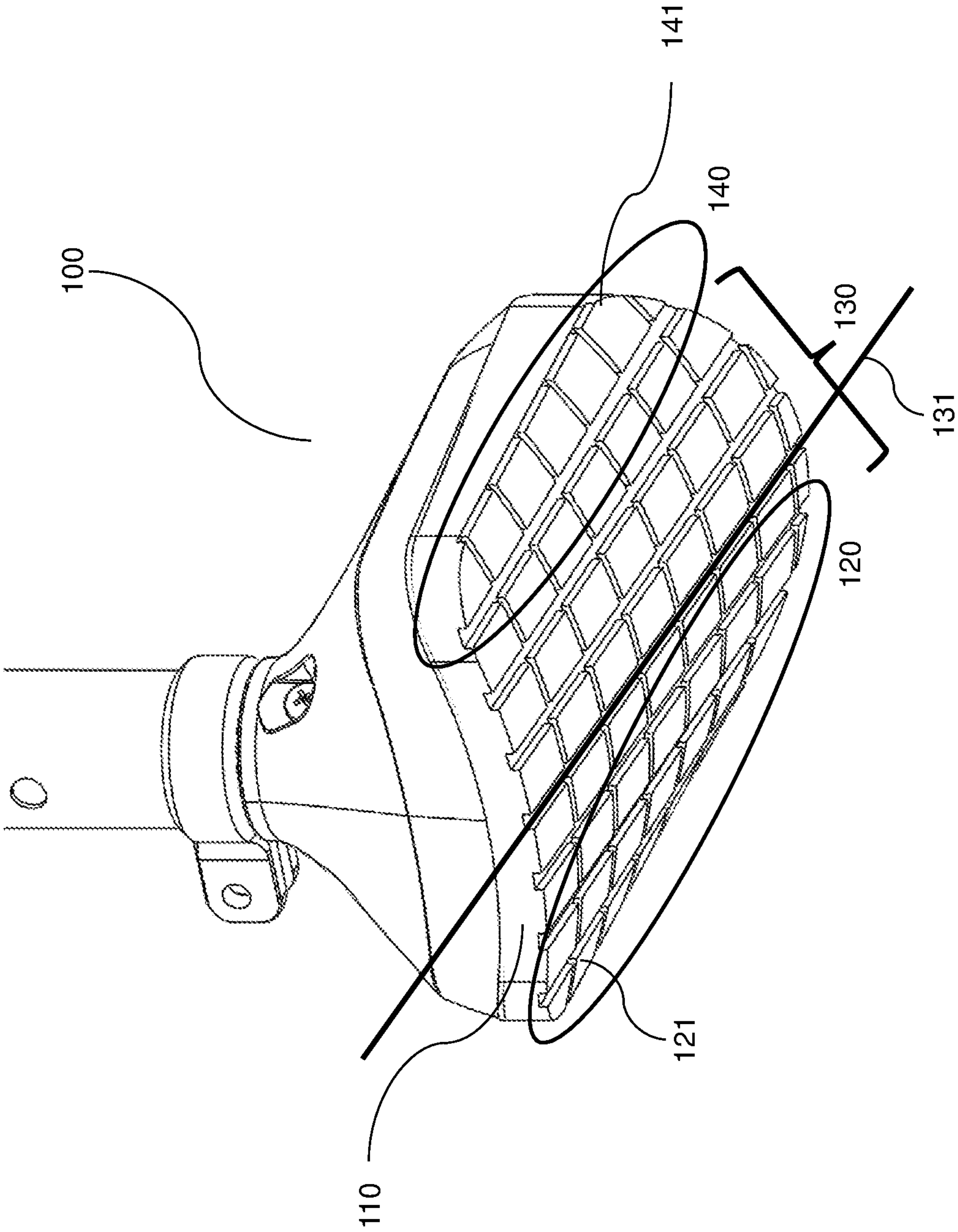
FIG. 1A shows a foot from an underside isometric perspective, according to an embodiment of the inventive subject matter.

FIG. 1A shows a foot 100 according to an embodiment of the inventive subject matter. As seen in FIG. 1, the foot 100 has a ground contact portion 110 which comes into contact with the ground as the wearer walks. As discussed herein, the ground contact portion 110 generally includes a toe section 120, a middle section 130, and a heel section 140. The middle section 130 is generally considered to be the section between the toe section 120 and heel section 140.

The toe section 120 includes a toe edge 121, which for this foot is the front edge of the ground contact portion 110. The heel section 140 can, in embodiments, also include additional area of the ground contact portion 110 forward of the heel edge 141. The toe edge 121 is only partially visible in FIG. 1A, but is visible in FIG. 1B and in subsequent figures.

Figure 1B:
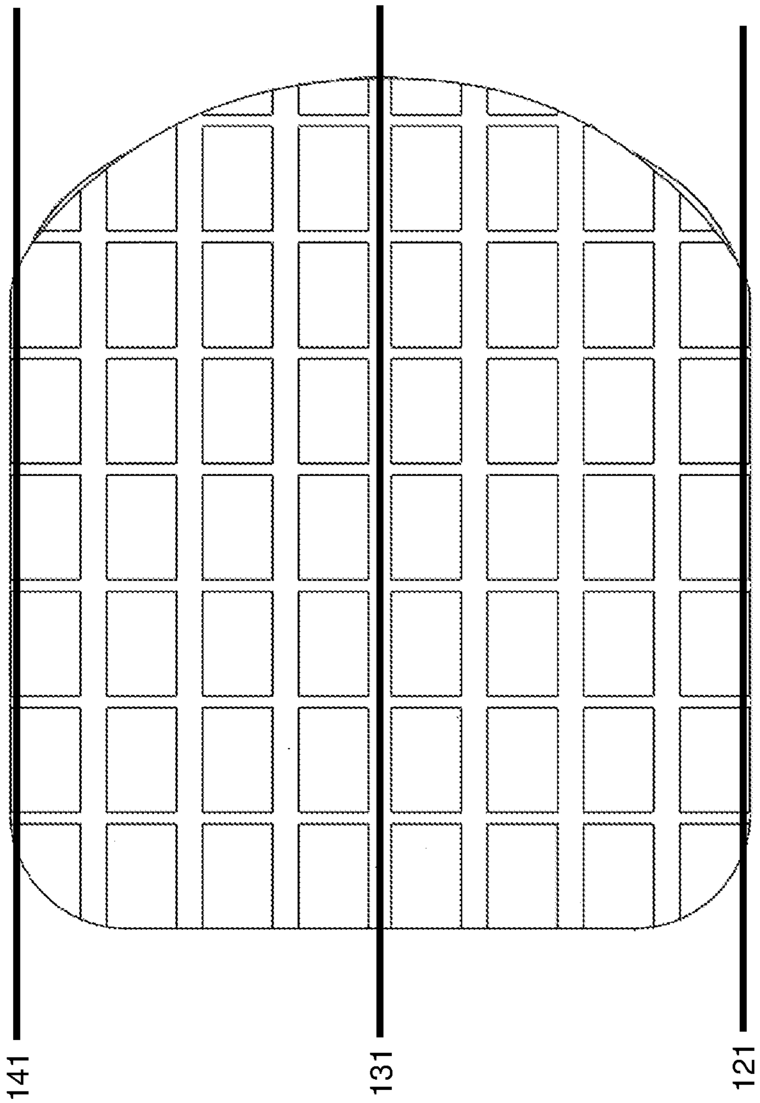
FIG. 1B shows the foot of FIG. 1A from the bottom.

FIG. 1B is an underside view of the foot 100, illustrating the heel edge 141, the toe edge 121 and a maximum camber line 131.

The heel section 140 includes a heel edge 141, which for this foot is the rear edge of the ground contact portion 110. The heel section 140 can, in embodiments, also include additional area of the ground contact portion 110 forward of the heel edge 141.

The foot 100 of the inventive subject matter is preferably used with a hands-free crutch, such as the hands-free crutch described in applicant's own patents, U.S. Pat. Nos. 9,408,443 and 10,624,810. U.S. Pat. Nos. 9,408,443 and 10,624,810 are incorporated by reference herein in their entirety.

The foot 100 shown in FIG. 1 is considered to be a right foot for the purposes of identifying the toe section 120 and heel section 140. However, in embodiments of the inventive subject matter, the foot 100 including the ground contact portion 110 can be symmetrical such that the foot can be used as a left foot as well. When reversed, the toe section 120 becomes the heel section 140 and the heel section 140 becomes the toe section 120.

In order to provide a wearer of a crutch with a more natural, more stable step, the ground contact portion 110 has a variable camber throughout the foot that varies from the toe section 120 through the middle section 130 and then again to the heel section 140.

In embodiments of the inventive subject matter discussed herein, the degree of camber of the toe section 120 is less than the degree of camber of the middle section 130. Likewise, the degree of camber of the heel section 140 is less than the degree of camber of the middle section 130.

In embodiments, the degree of camber of the foot increases from the toe section 120 to a peak camber within the middle section 130, and then decreases rearwardly towards the heel section 140. The point of peak/maximum camber is illustrated with line 131.

In the embodiment shown in FIG. 1, the smallest camber of the toe section 120 is at the toe edge 121, and the camber then grows gradually until a peak camber angle point 131 at the midpoint of the middle section 130 (which is also the mid-point rearwardly of the ground contact portion 110). The camber then decreases rearwardly until it reaches the heel edge 141 of heel section 140. It is contemplated that the maximum camber point 131 can be located at a point other than the midpoint of the ground contact portion 110. Thus, in embodiments, the maximum camber point 131 can be at some point between the toe edge 121 and heel edge 141.

Because the foot 100 and ground contact portion 110 are symmetrical in FIG. 1, the camber at the toe edge 121 and heel edge 141 are the same. A symmetrical foot design is beneficial for a foot that can be adapted to serve either the left leg or the right leg by simply rotating the foot 180 degrees about a post or other structure of the lower leg portion 200. However, in other embodiments, the camber angle of the toe section 120 and/or toe edge 121 can be different than the camber angle of heel section 140 and/or heel edge 141.

In embodiments of the inventive subject matter, the camber angle at the toe edge 121 and/or at the heel edge 141 is zero degrees from horizontal. Thus, in these embodiments, the toe edge 121 and/or heel edge 141 is/are parallel to the ground when stepping on this part of the foot.

When a person takes a step and places their foot on the ground, the first point of contact between the foot and the ground is at the heel. This point of the stride or step can be called the "heel strike". FIGS. 2A-2D illustrate different views of the foot 100 at the heel strike point.

Figure 2B:
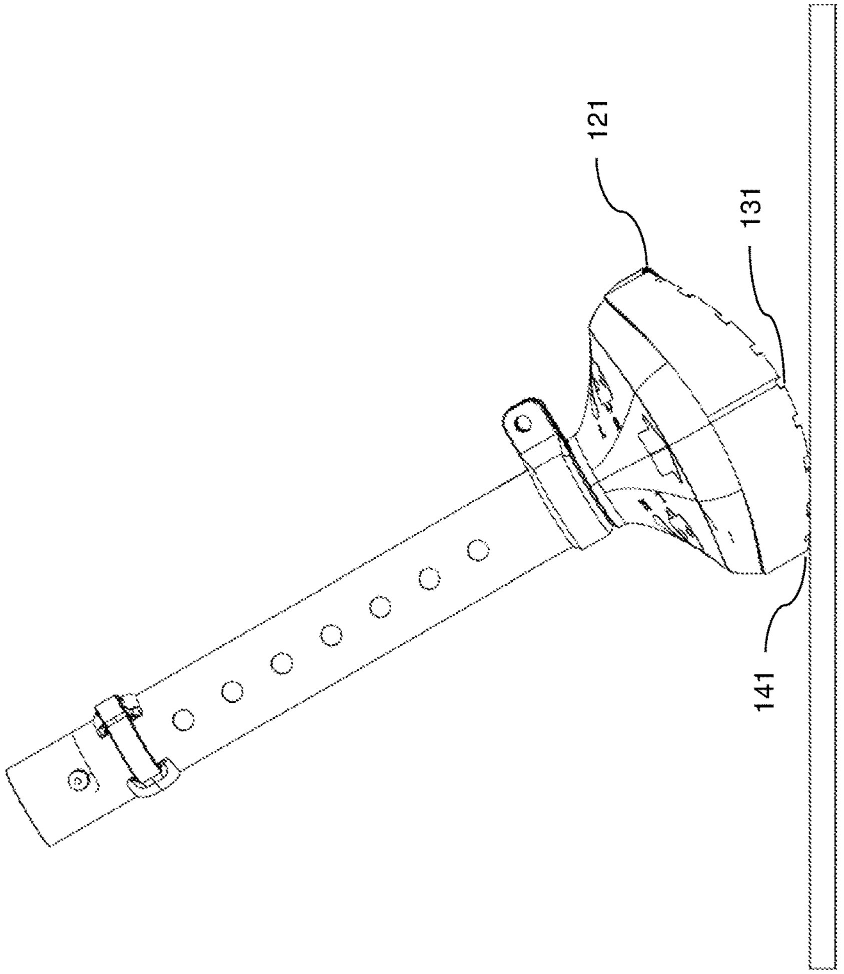
FIGS. 2A and 2B show a rear and outside view of the foot, respectively, at the heel strike portion of the step.
Figure 2A:
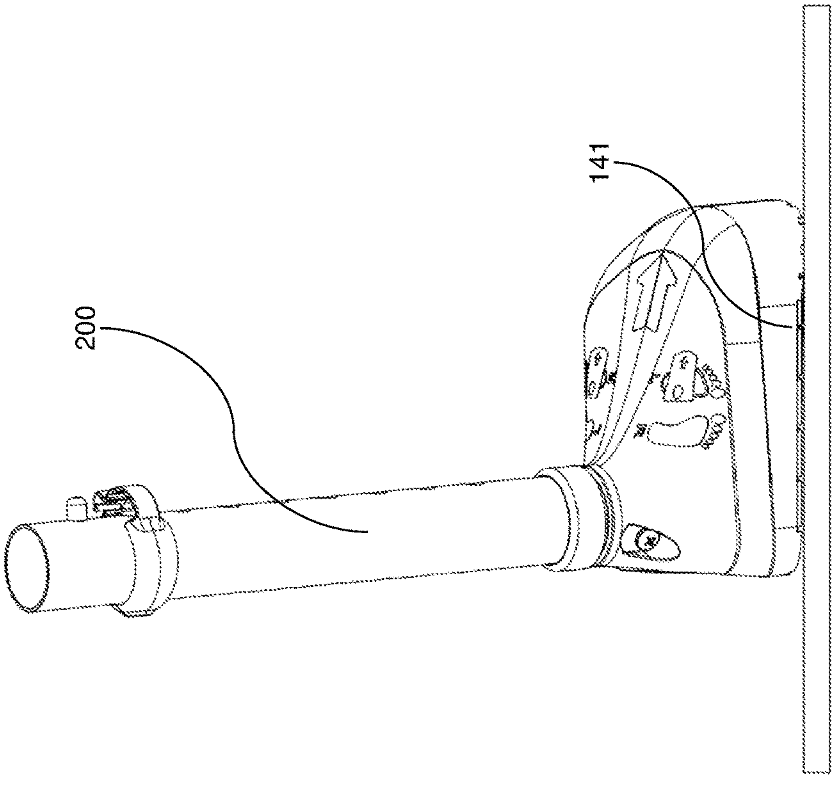
Figure 2C:
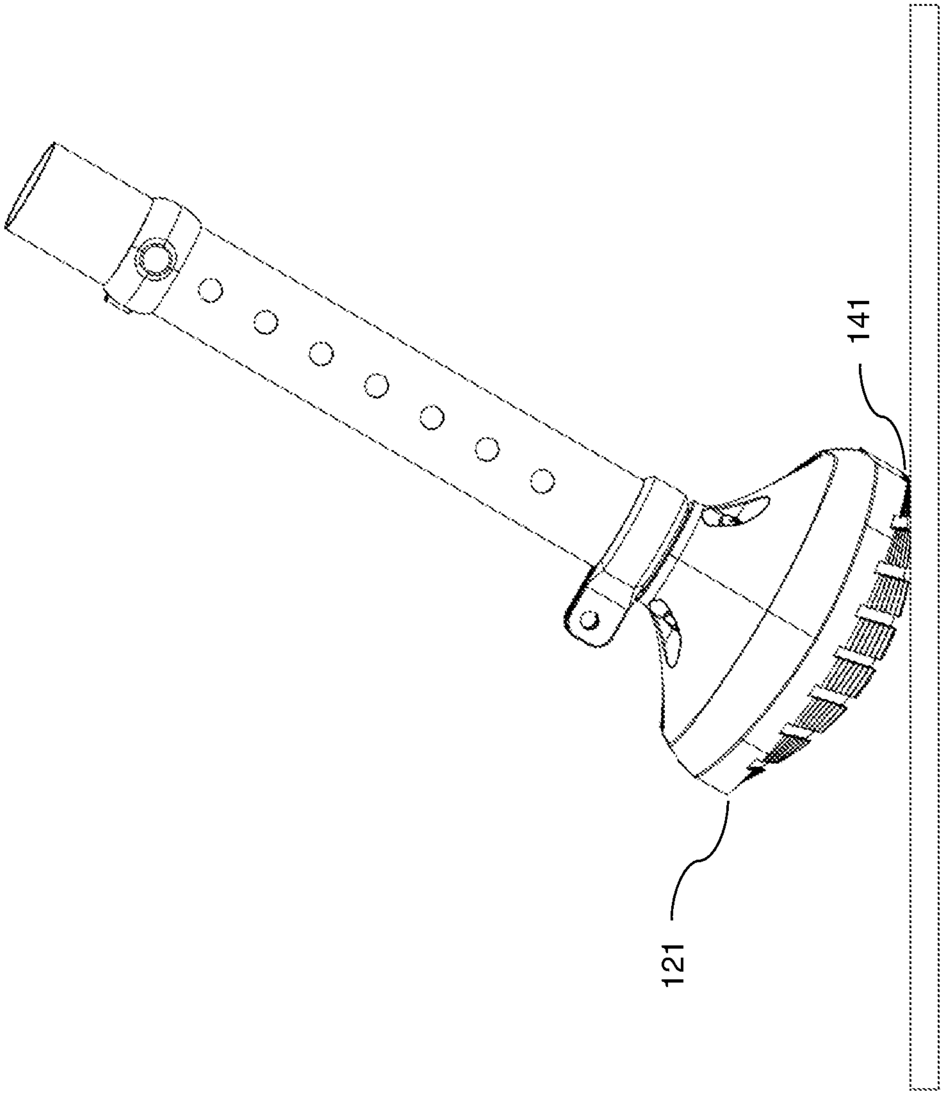
FIGS. 2C and 2D show an inner side and perspective view of the foot, respectively, at the heel strike portion of the step.
Figure 2D:
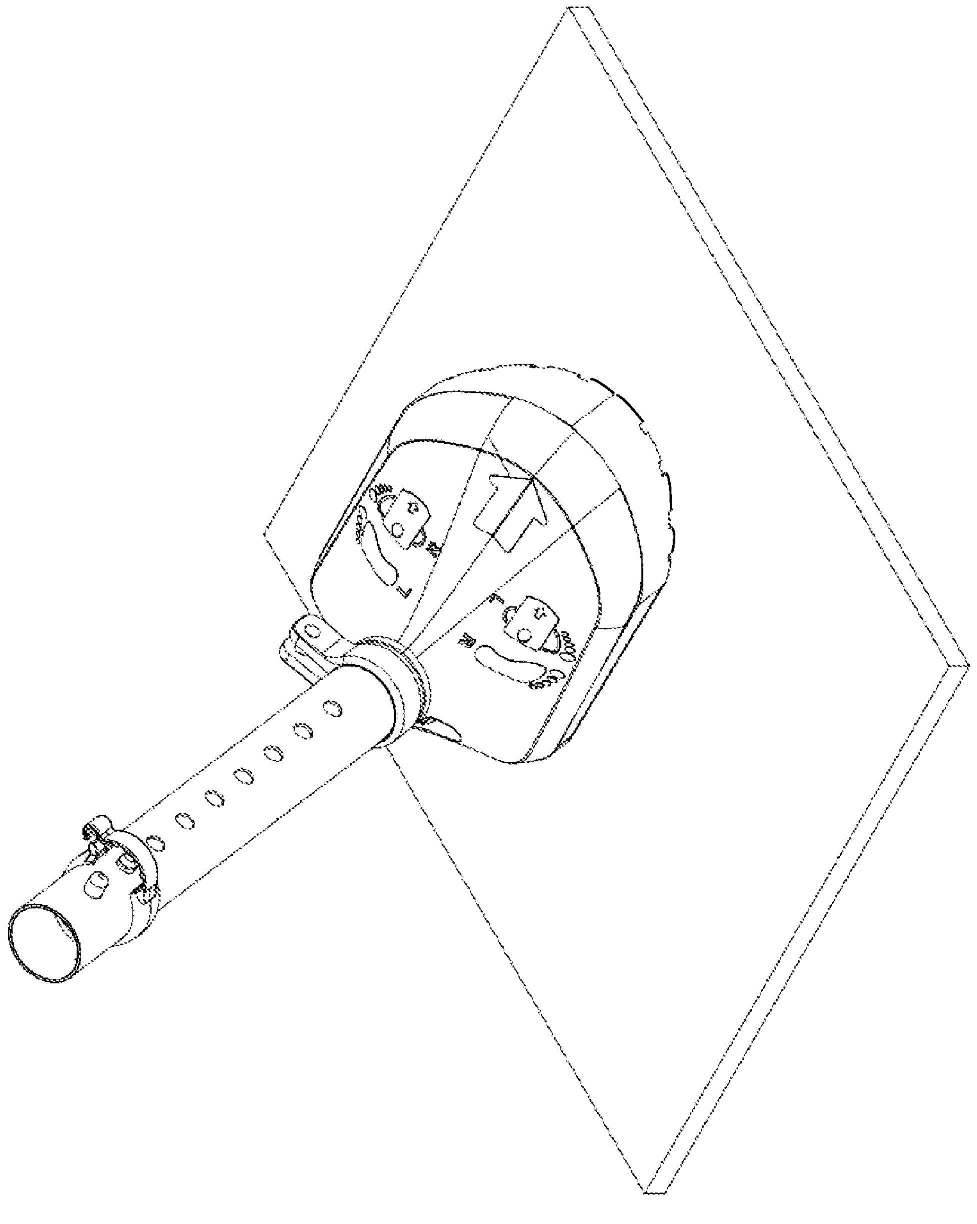
Figure 3B:
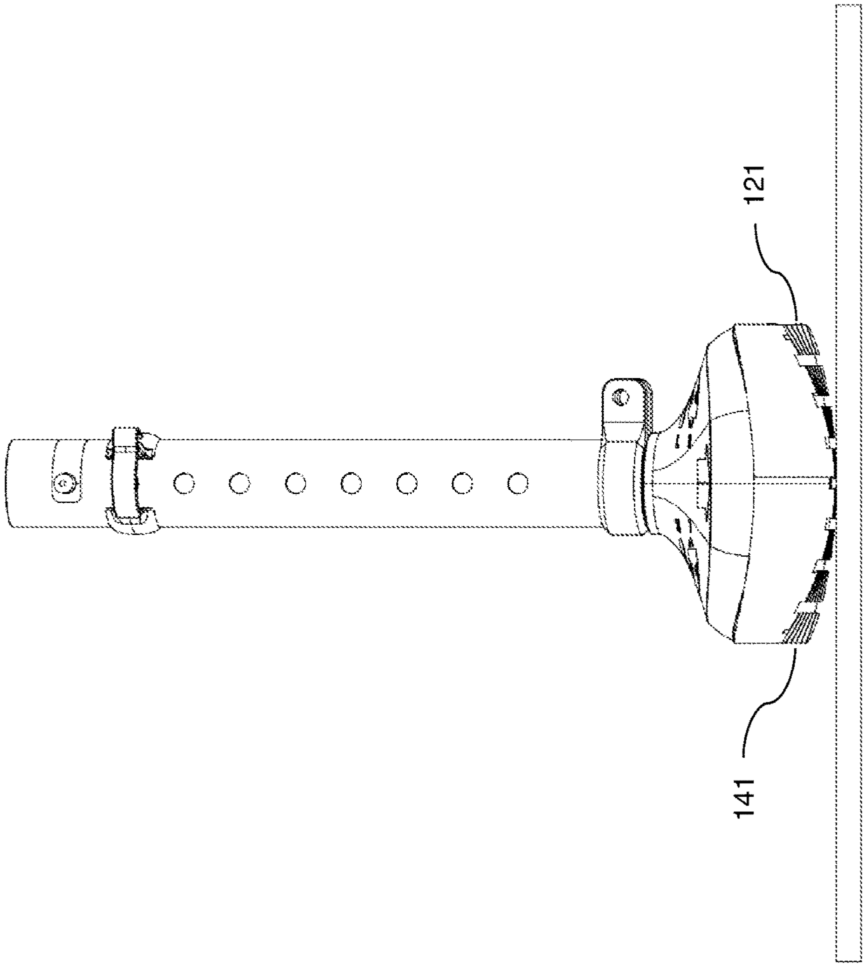
FIGS. 3A-3D show a rear, outside, inner side and perspective view of the foot, respectively, at the midpoint of the step.
Figure 3A:
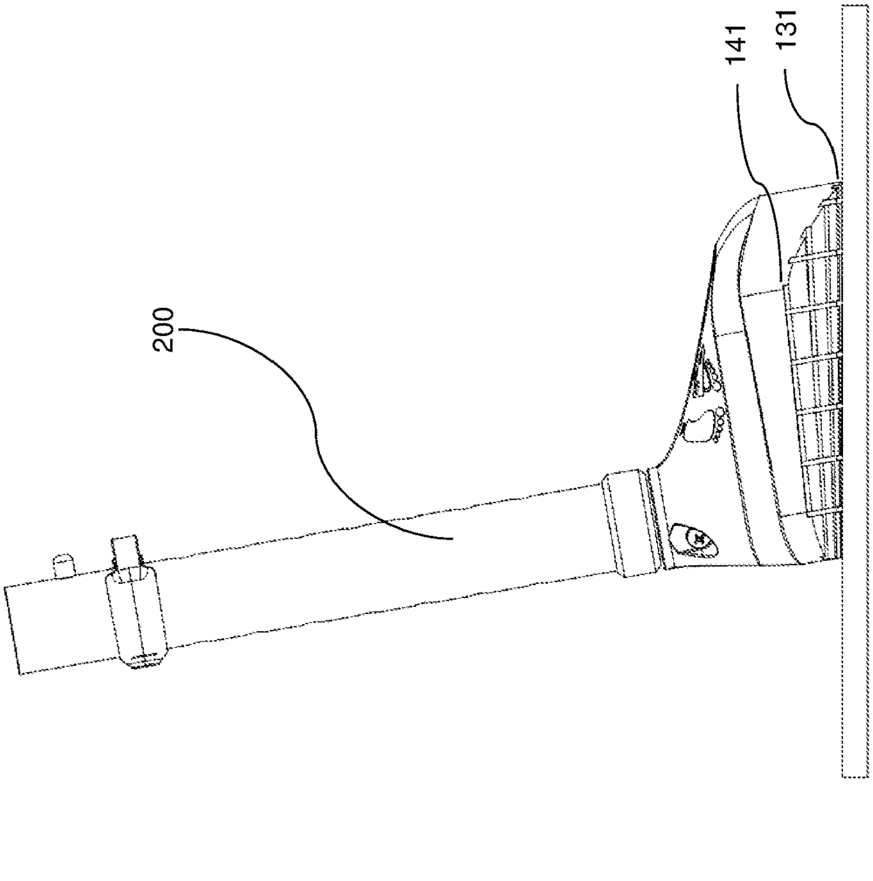
Figure 3C:
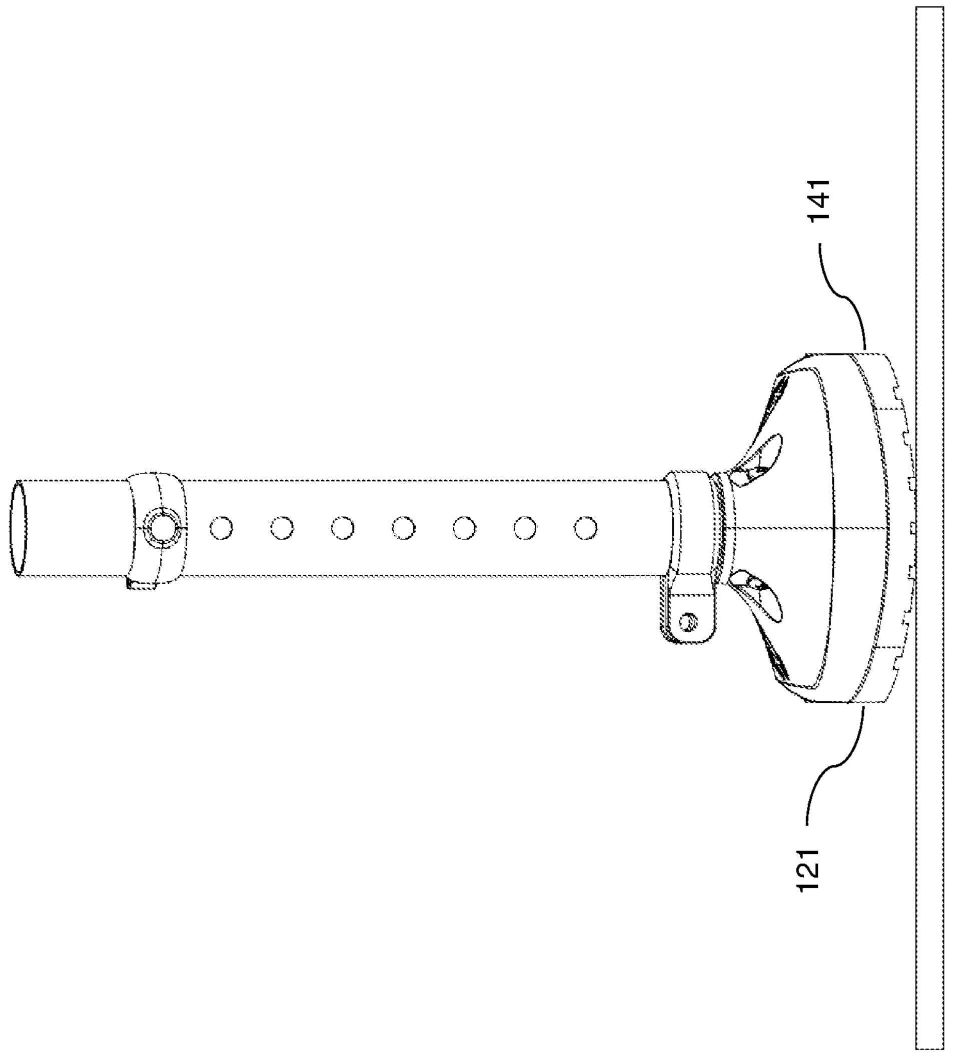
Figure 3D:
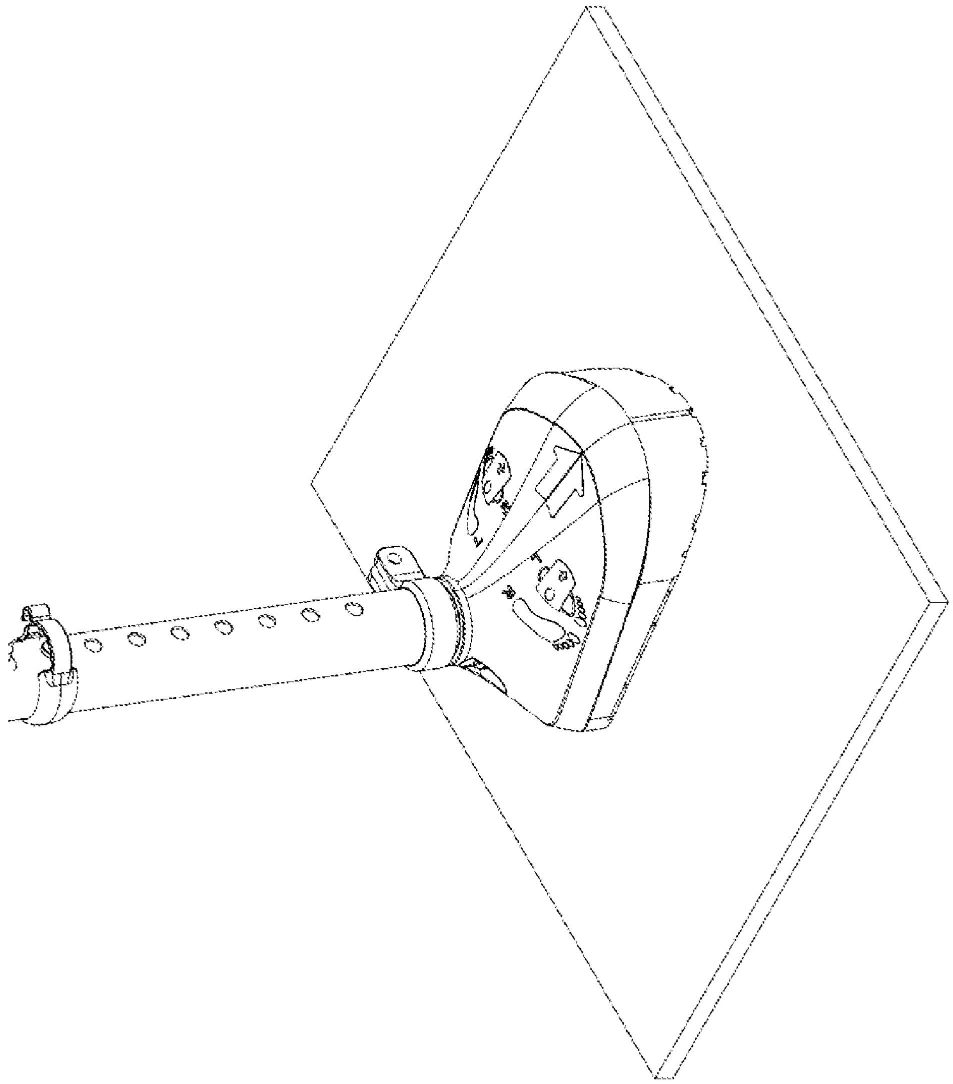

FIG. 2A is a rear view of the foot. FIG. 2B shows an outside side view. FIG. 2C is an inside side view (i.e., looking outward from between the legs), and FIG. 2D is a perspective view.

As seen in FIGS. 2A-2D, the camber angle of the foot 100 (and thus, the crutch as a whole) at the heel strike point is that of the heel edge 141. As visible in FIG. 2A, the camber angle of the heel edge 141 is relatively small, which translates to a relatively small lateral off-vertical angle of the lower leg portion 200 of the crutch.

As a person continues a step or stride after the heel strike, the foot rolls forward naturally from the heel towards the midpoint of the foot and then towards the toes. The same applies to the use of the foot 100 of the inventive subject matter. FIGS. 3A-3D show the foot 100 at the midpoint of the step, also known as the "mid-stance" point of the step. The views of FIGS. 3A-3D mirror those of FIGS. 2A-2D, showing a rear view, an outside side/lateral view, an inside side/lateral view and a perspective view, respectively.

At the mid-stance point of the step, the foot 100 is contacting the ground at the maximum camber angle line 131. Thus, at this point, the camber angle experienced by the user is at its peak. This can be seen in the greater off-vertical angle of the lower leg portion 200 of the crutch.

Figure 4:
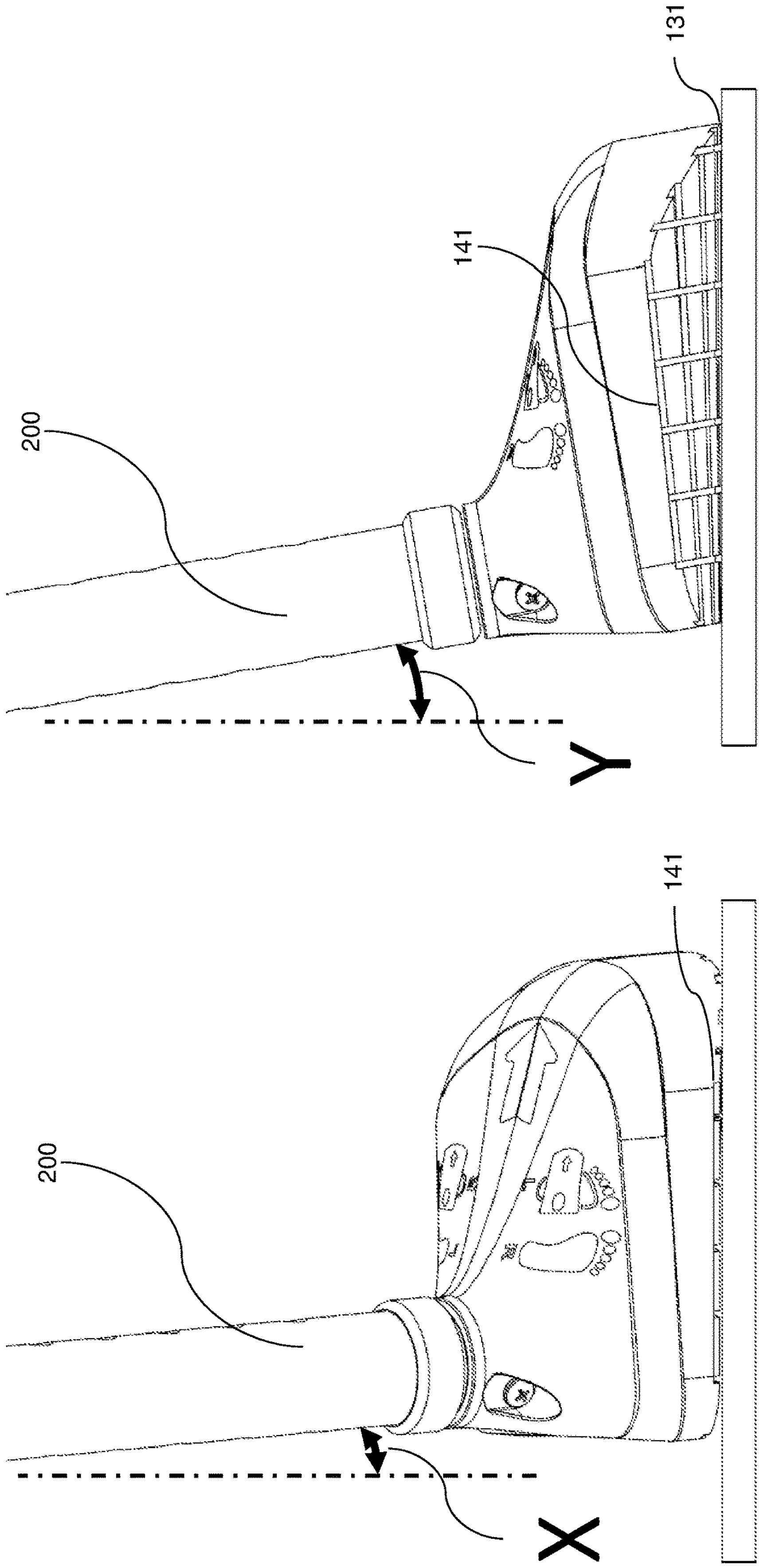
FIG. 4 shows a side-to-side comparison of the difference in camber angles at the heel strike and the mid-stance point, according to embodiments of the inventive subject matter.
Figure 5B:
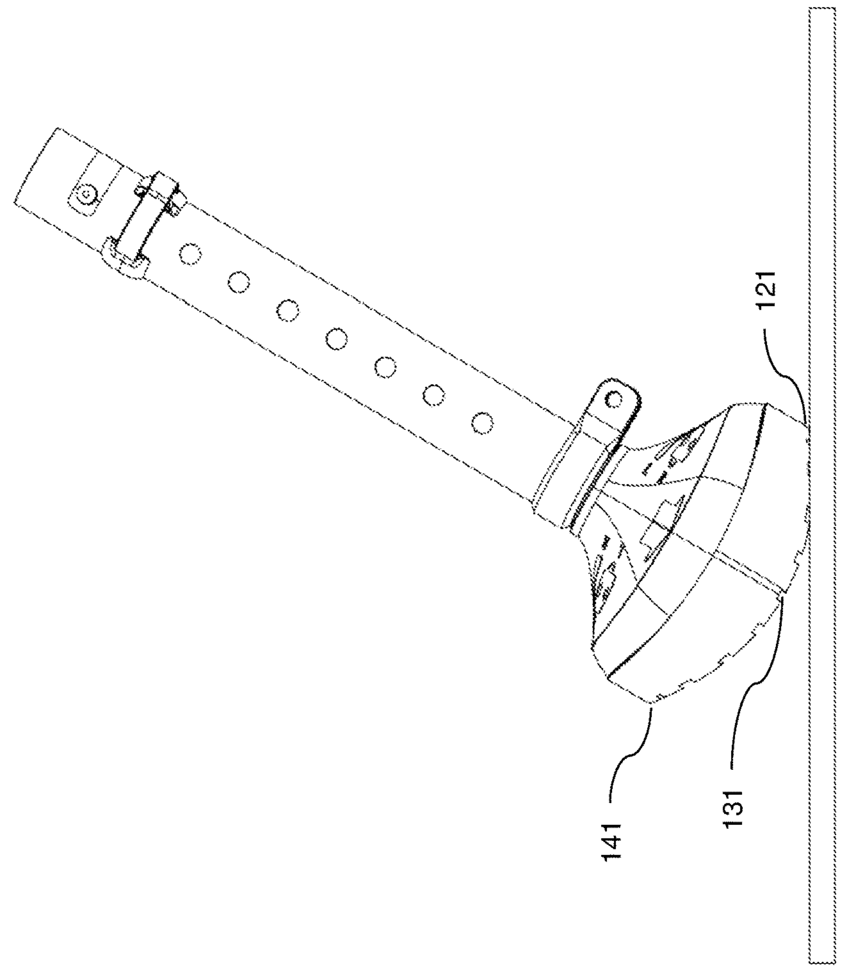
FIGS. 5A-5D show a rear view, an outside side/lateral view, an inside side/lateral view and a perspective view, respectively, of the foot at the toe-off point.
Figure 5A:
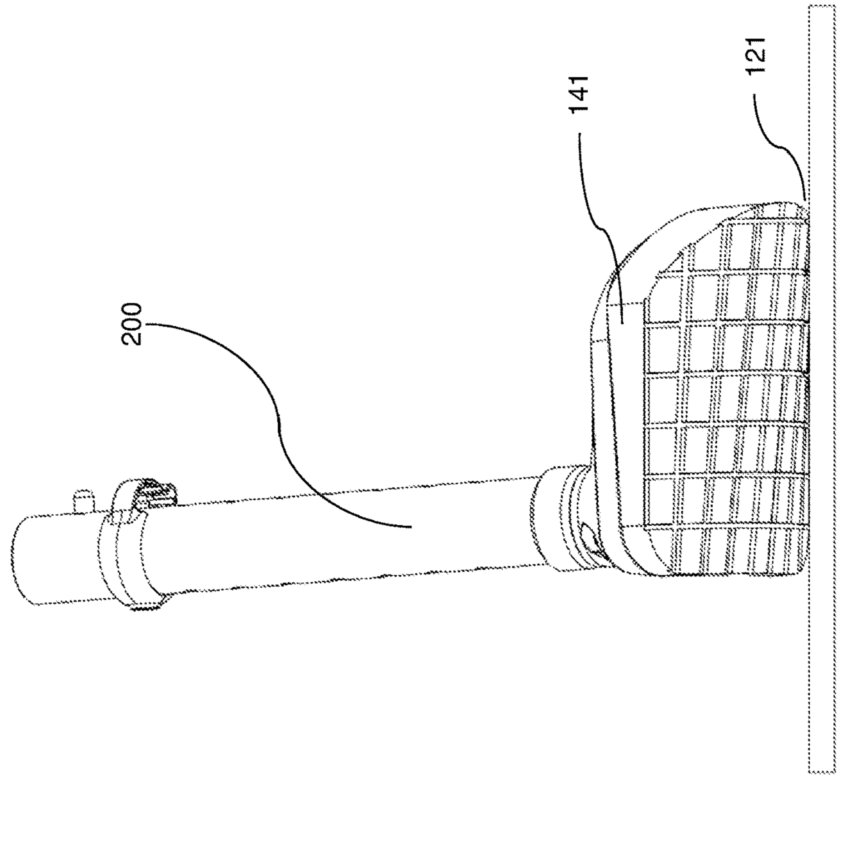
Figure 5C:
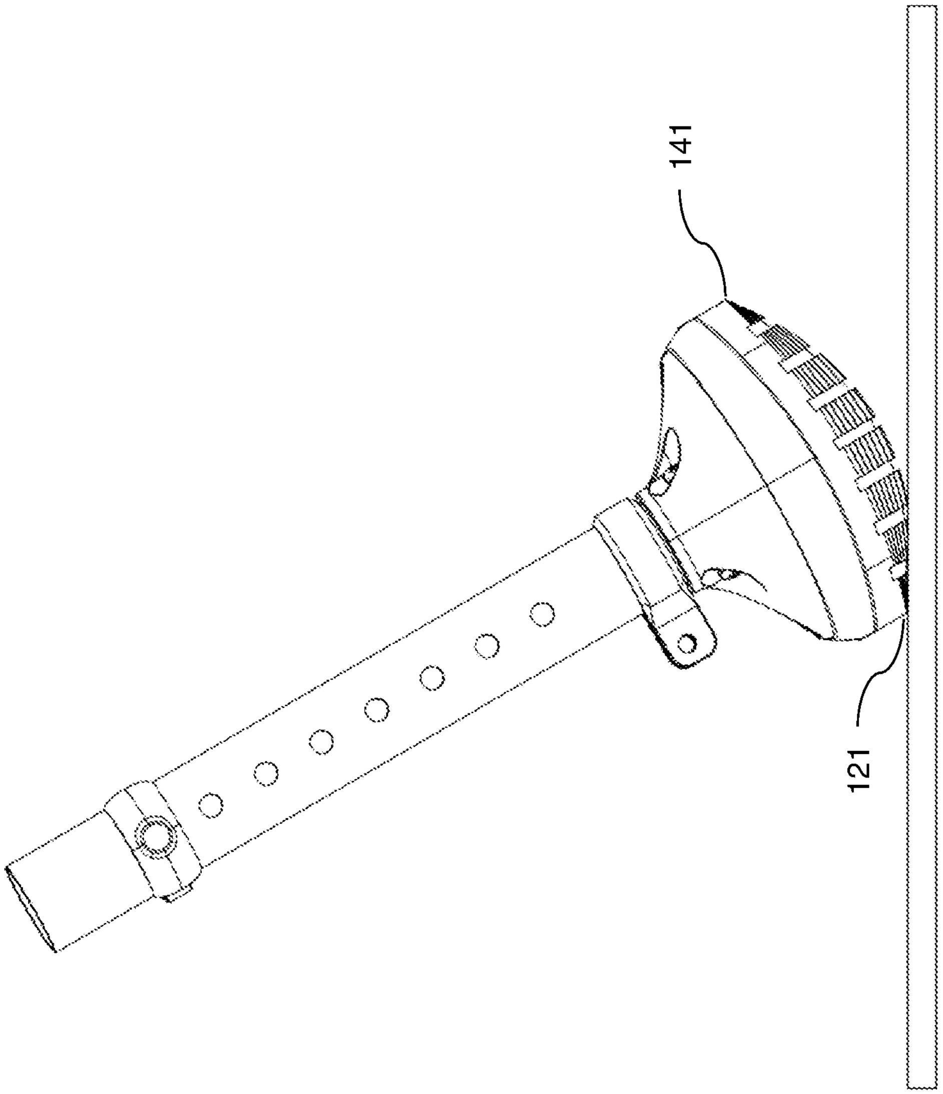
Figure 5D:
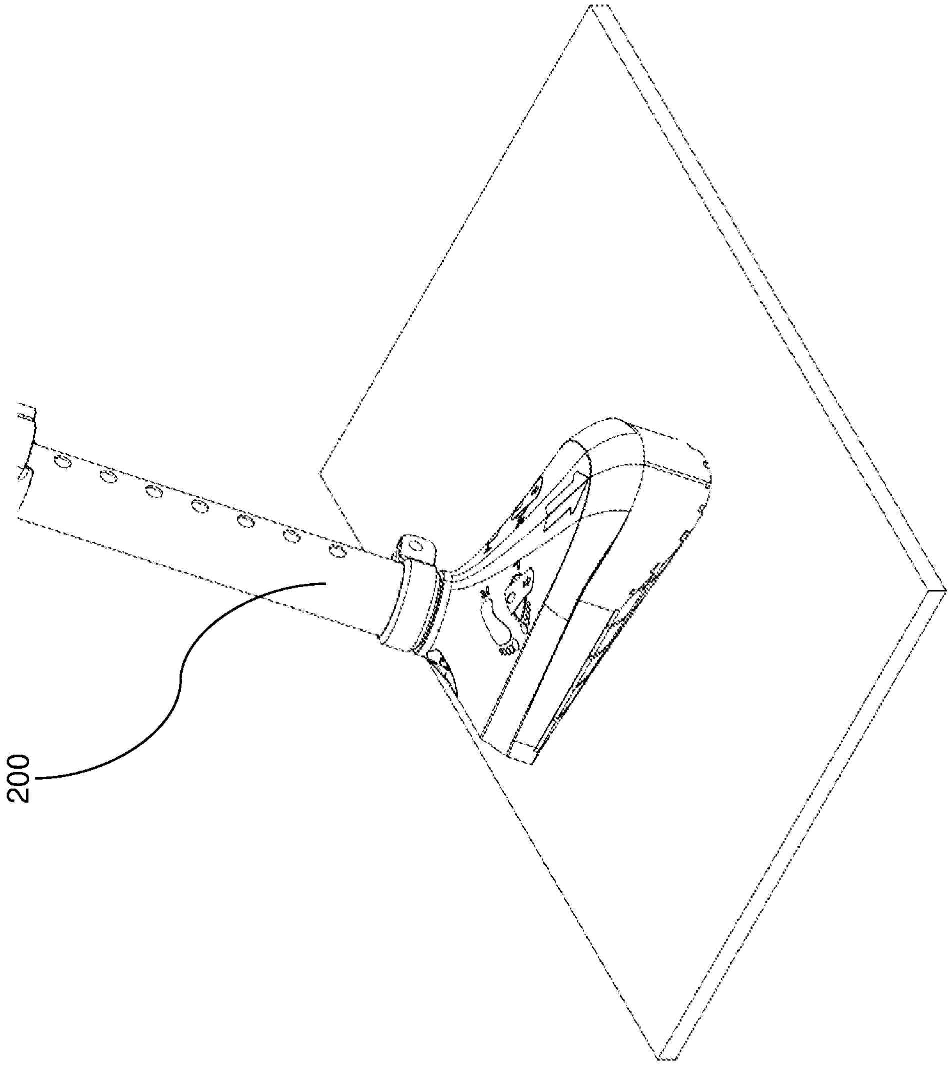

A side-to-side comparison of the camber angles experienced by the foot 100 at the heel strike point and at the mid-stance point (which in this example is the maximum camber angle 131) can be seen in FIG. 4.

The left side of FIG. 4 shows the view of FIG. 2A at the heel strike moment. The relatively low camber at heel edge 141 translates to a relatively low off-vertical angle "X" for the lower leg portion 200 of the crutch. The right side of FIG. 4 shows the view of FIG. 3A at the mid-stance moment. The higher camber at the maximum camber point/line 131 translates to a higher off-vertical angle "Y" for the lower leg portion 200 of the crutch.

The final point of a step or stride is the toe-off point. At the toe-off point, a person pushes off with their toes and lifts the foot off the ground. FIGS. 5A-5D show a rear view, an outside side/lateral view, an inside side/lateral view and a perspective view, respectively, of the foot 100 at the toe-off point.

As seen in FIGS. 5A-5D, at the toe-off point, the toe edge 121 is in contact with the ground and is typically the final point of contact before the foot is lifted off the ground. The camber angle at the toe edge 121 is less than that of the maximum camber line 131, and as such the off-vertical angle of the lower leg portion 200 of the crutch will be less than that of the mid-stance point.

In embodiments of the inventive subject matter, the ground contact portion 110 can have two or more sections of different camber angles. The camber angles of each of the sections can be lesser or greater than the camber angles of adjacent sections. This can include a ground contact portion can have two or more sections of greater camber with sections of a lesser camber in between. For example, the ground contact portion 110 can have two areas of maximum camber 131 with a region of lesser camber between these two areas. In another example of these embodiments, there could be a section of first camber angle immediately followed by a section of a second camber angle and then followed by a section of a third camber angle that is different from the first camber angle and the second camber angle. In this example, the first camber angle could be greater than the third camber angle, which in turn is greater than the second camber angle.

A hands-free crutch can be difficult for new users to adapt to. A narrower foot generally offers more agility (e.g., ability to turn, pivot, etc.) and as such is preferred by experienced users. However, a narrow foot is less stable for new/inexperienced users. Additionally, a narrower foot can make adjusting for varus or valgus conditions on some users more difficult.

A wider foot provides greater stability than a narrow foot. Additionally, a wider foot makes it easier to obtain proper fit to the user. But as the foot increases in width, the negative effects of camber increase accordingly.

To solve this problem, embodiments of the inventive subject matter include a foot having variable camber along the lateral cross-section of the foot.

Figure 6:
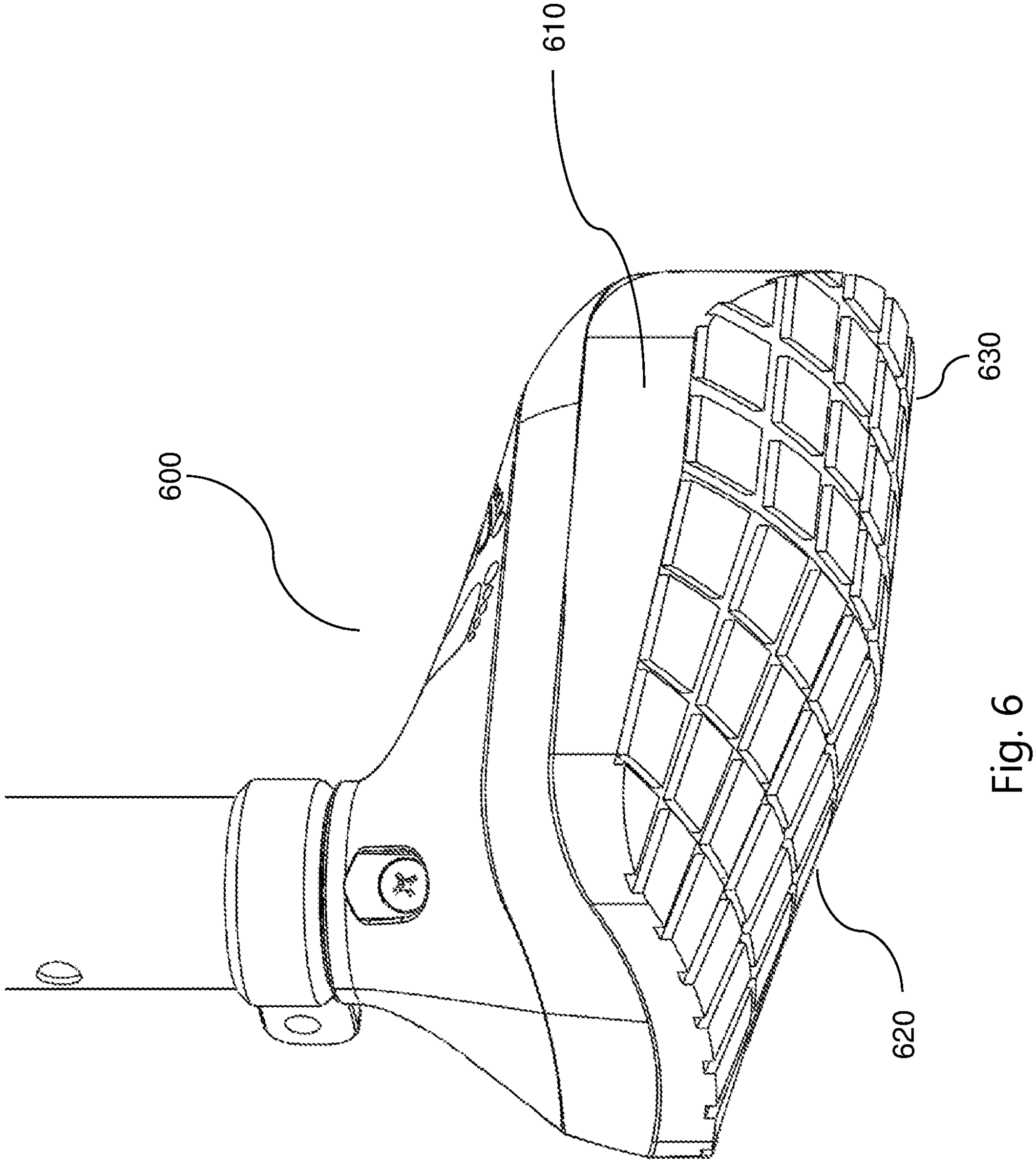
FIG. 6 shows a foot with different cambers to assist a new user, according to embodiments of the inventive subject matter.

FIG. 6 shows a foot 600 according to these embodiments of the inventive subject matter. The foot of FIG. 6 has a ground contact portion 610 that has two principal sections 620, 630 that are laterally arranged along the length of the ground contact portion 610.

As seen in FIG. 6, the inner section 620 has a different camber angle than the outer section 630. The inner section 620 is disposed on the ground contact portion 610 such that it is the primary contact surface when the crutch is properly used.

FIGS. 7A-7D illustrate rear, outer side, inner side and perspective views, respectively, of the midstance point of a step wherein the user is walking properly and the inner section 620 is contacting the ground. As is visible in FIG. 7A, the difference in camber angle between sections 620 and 630 result in the outer section 630 being off the ground when the inner section 620 is contacting the ground. Therefore, while the user is properly using the foot by relying on inner section 620, the outer section 630 does not interfere or affect the stride in any way.

Figure 7B:
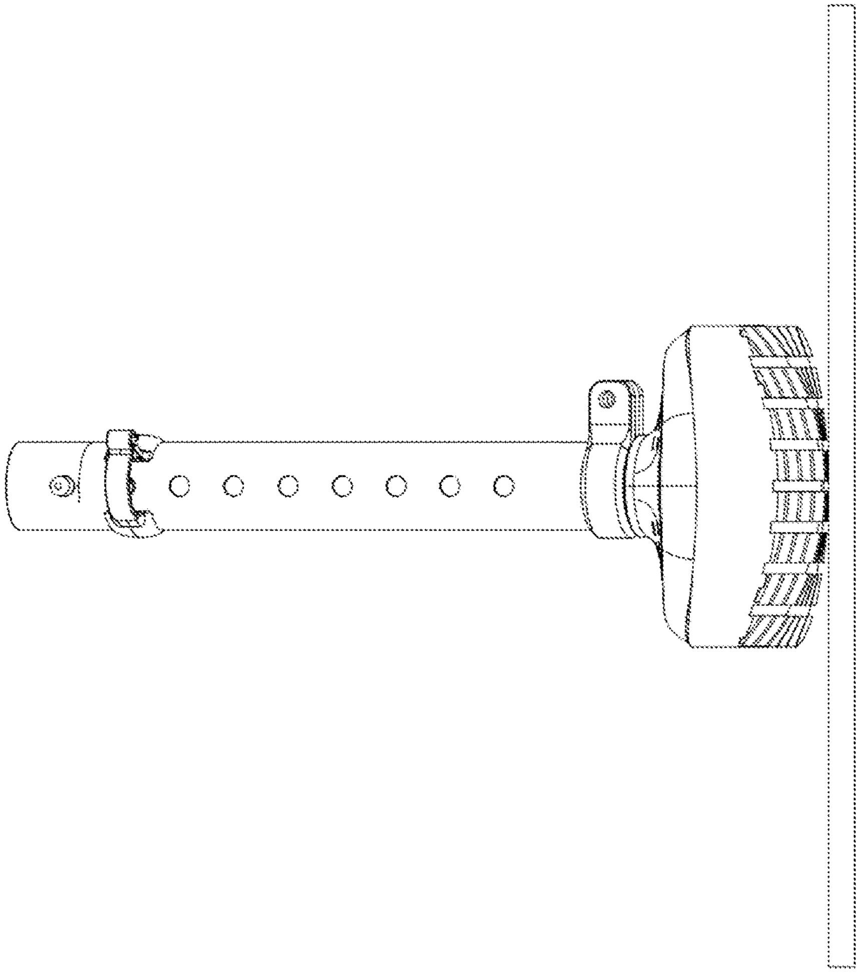
FIGS. 7A-7D illustrate rear, outer side, inner side and perspective views, respectively, of the midstance point of a step of the foot of FIG. 6, wherein the user is walking properly and the inner section is contacting the ground.
Figure 7A:
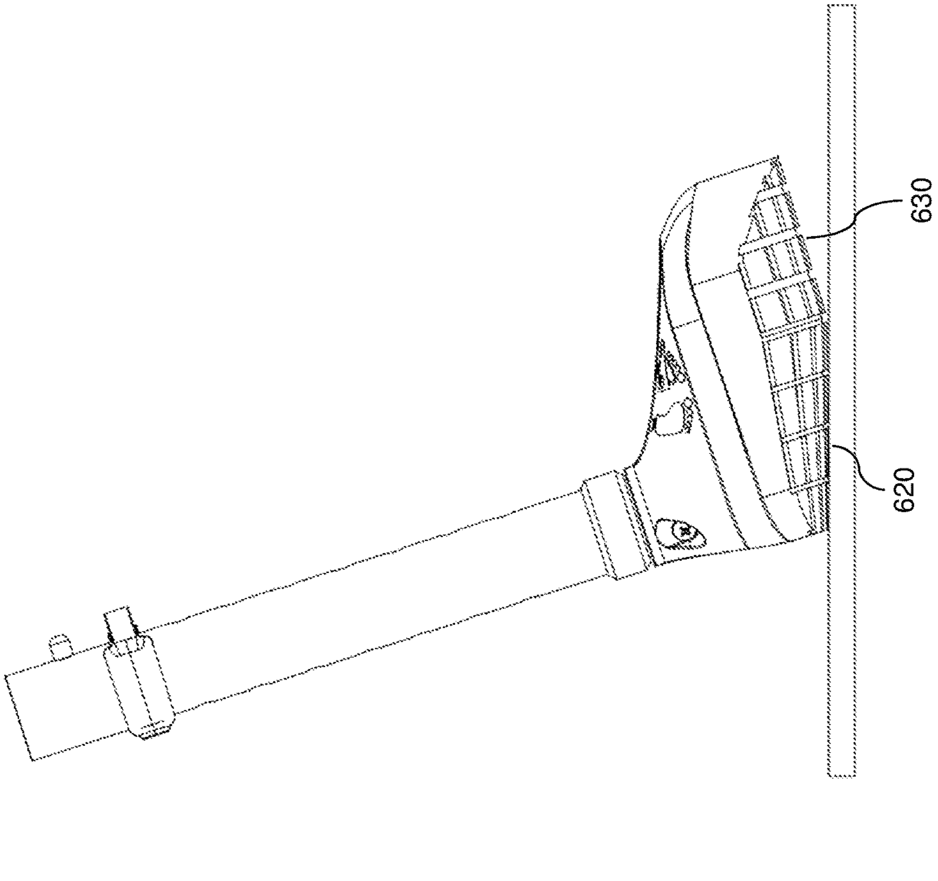
Figure 7C:
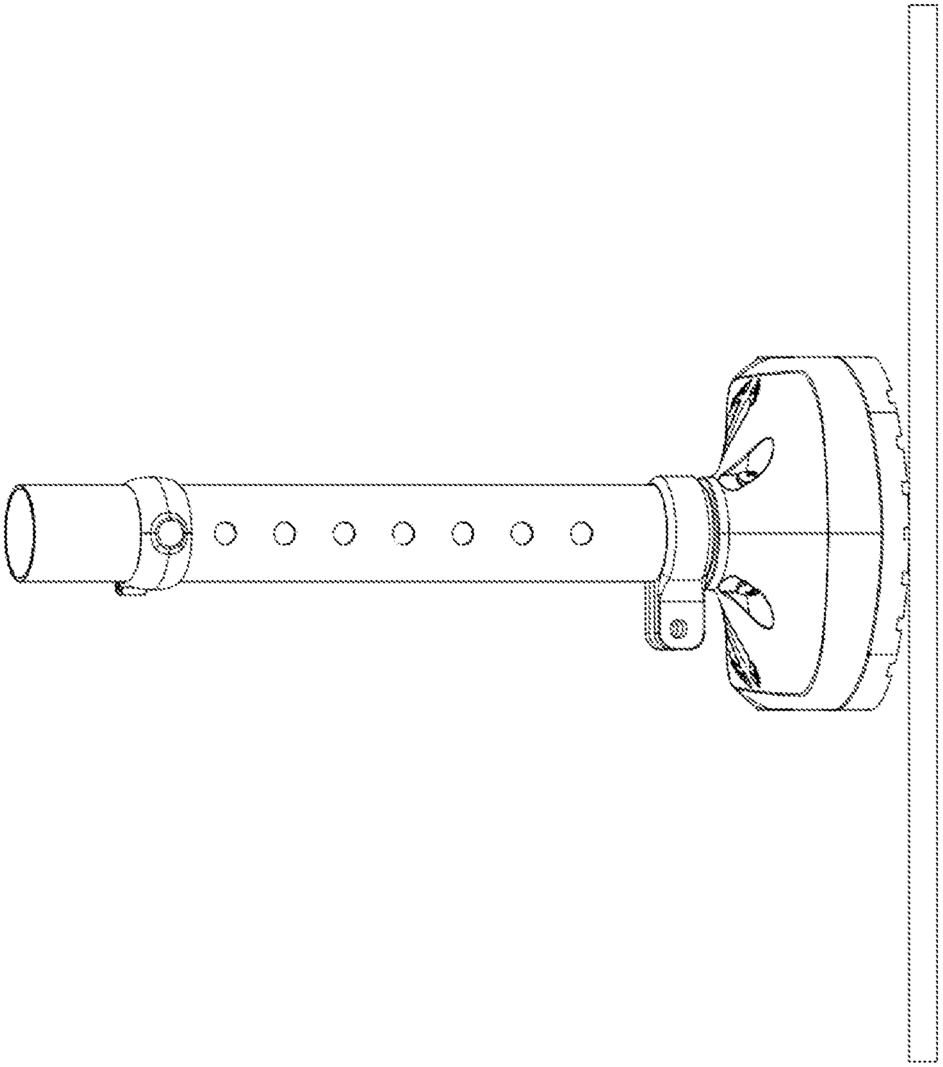
Figure 7D:
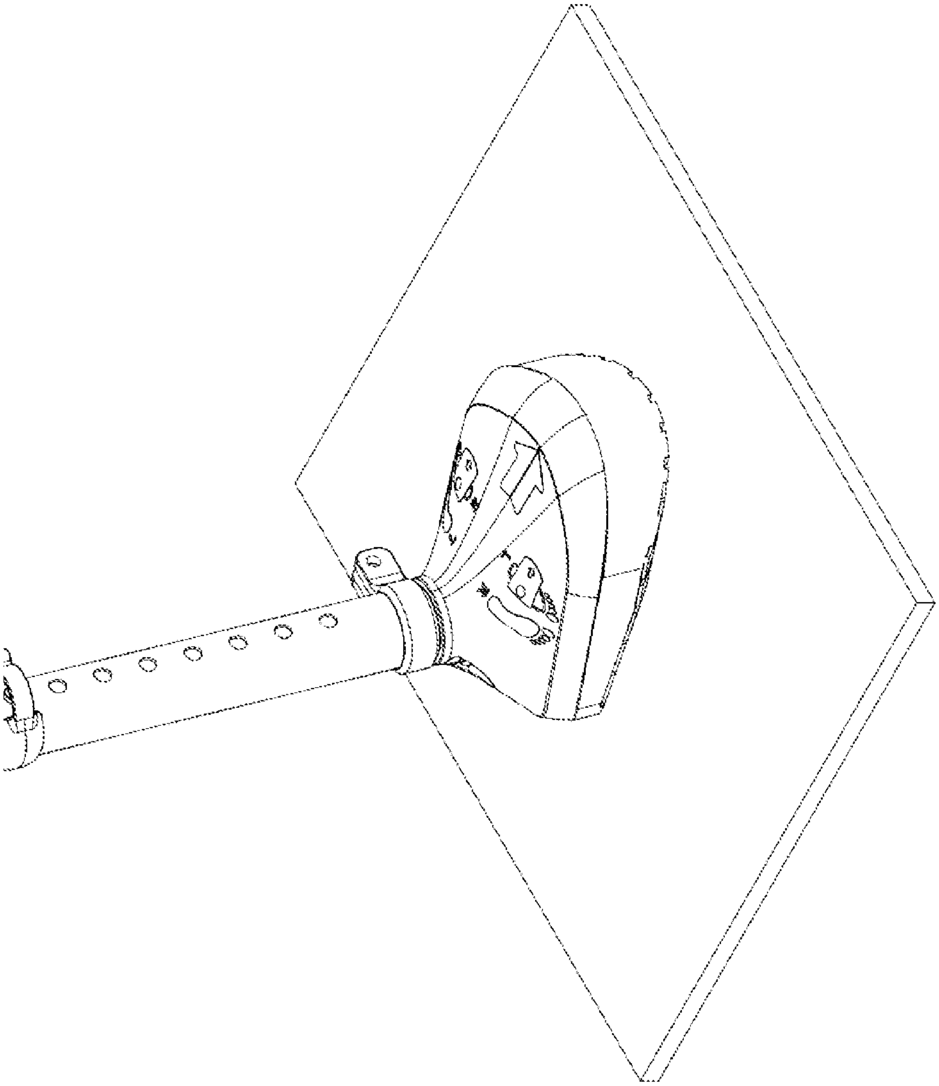

As can be seen in FIGS. 6 and 7A, the camber angle of the outer section 630 is less than the camber angle of the inner section 620. In embodiments of the inventive subject matter, the camber angle of outer section 630 can be zero or approximately zero.

Figure 8B:
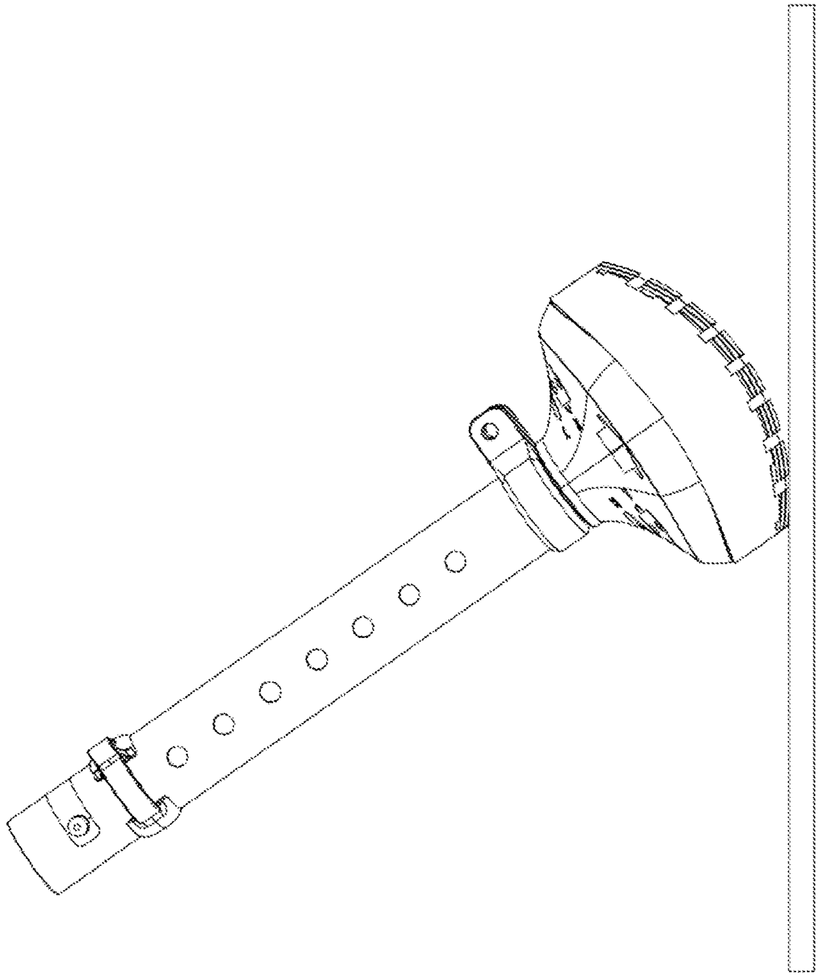
FIGS. 8A-8D illustrate rear, outer side, inner side and perspective views, respectively, of the heel-strike point of the step using the foot of FIG. 6, where the inner section is used to contact the ground.
Figure 8A:
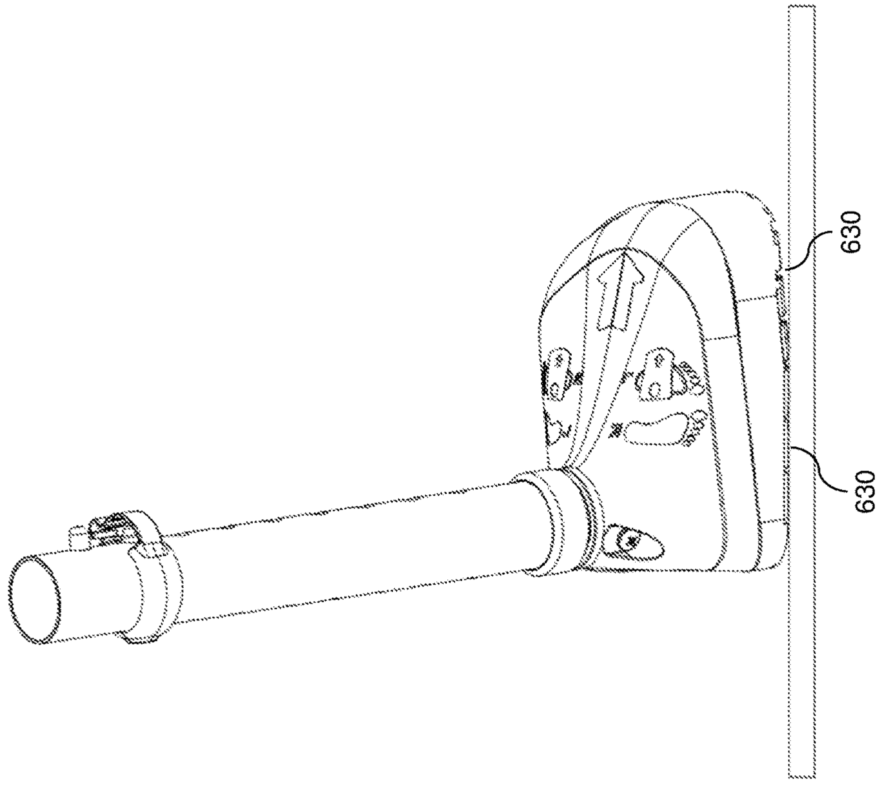
Figure 8C:
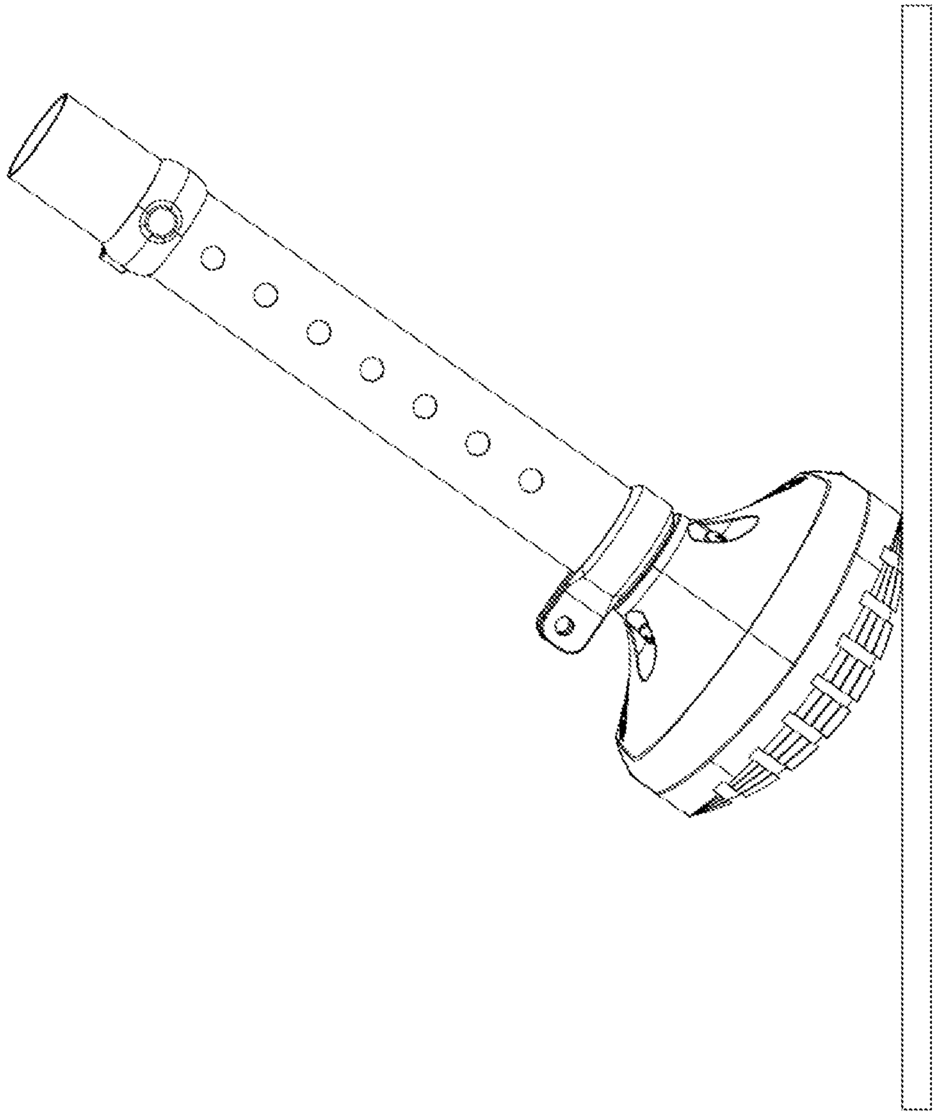
Figure 8D:
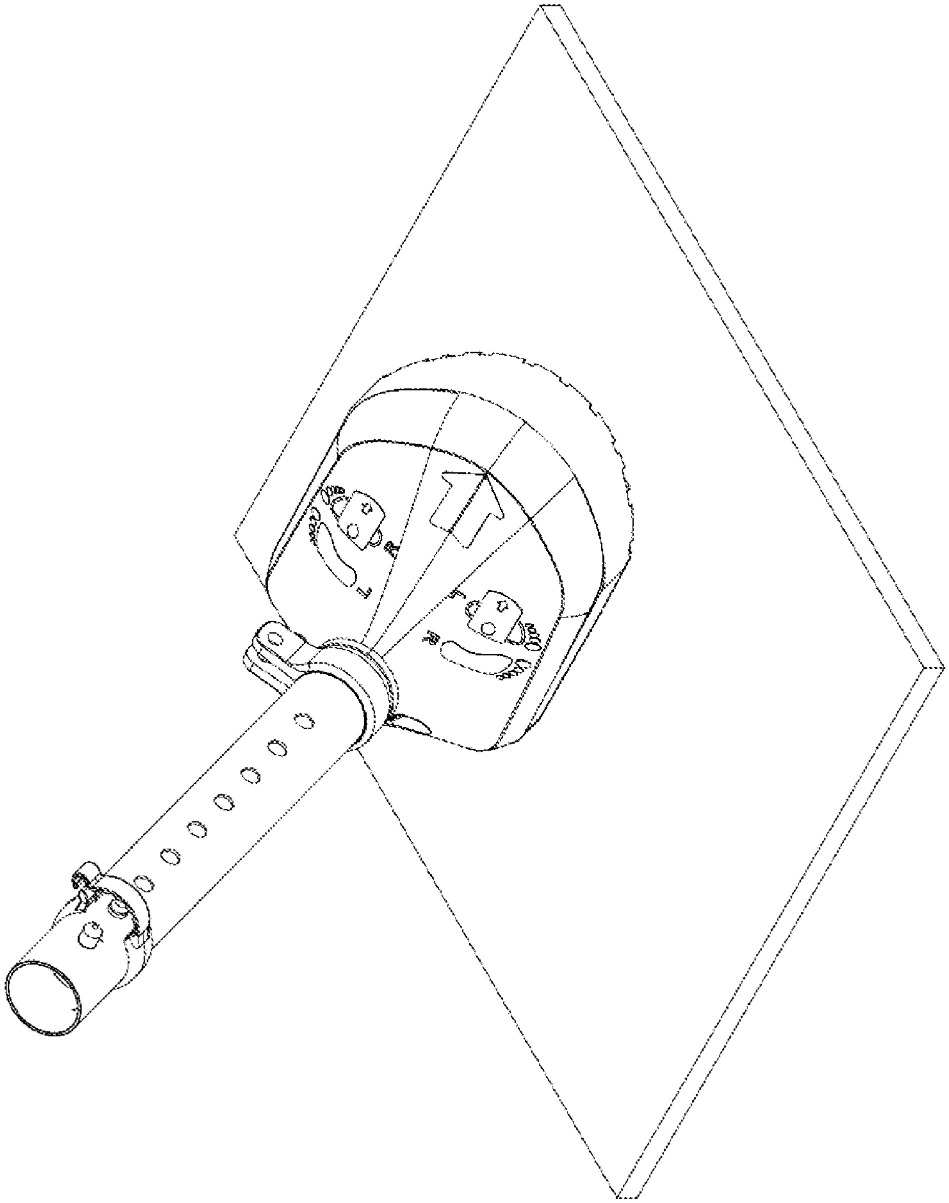
Figure 9B:
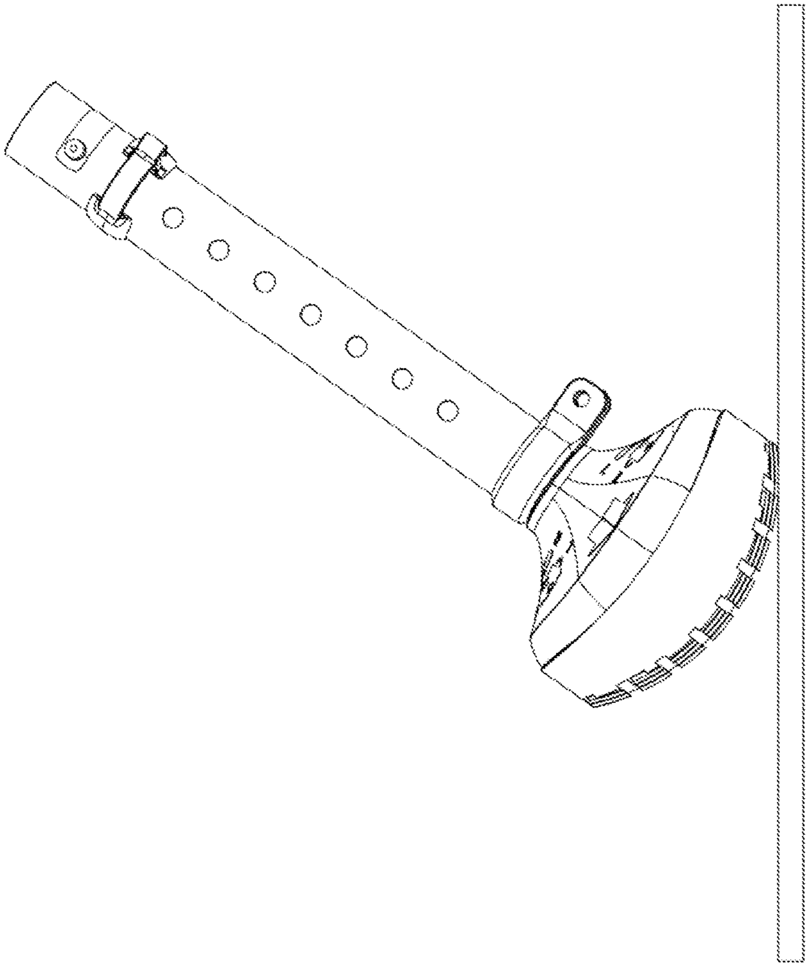
FIGS. 9A-9D illustrate the rear, outer side, inner side and perspective views, respectively, of the toe-off point of this same step of the foot of FIG. 6, that uses inner section to contact the ground.
Figure 9A:
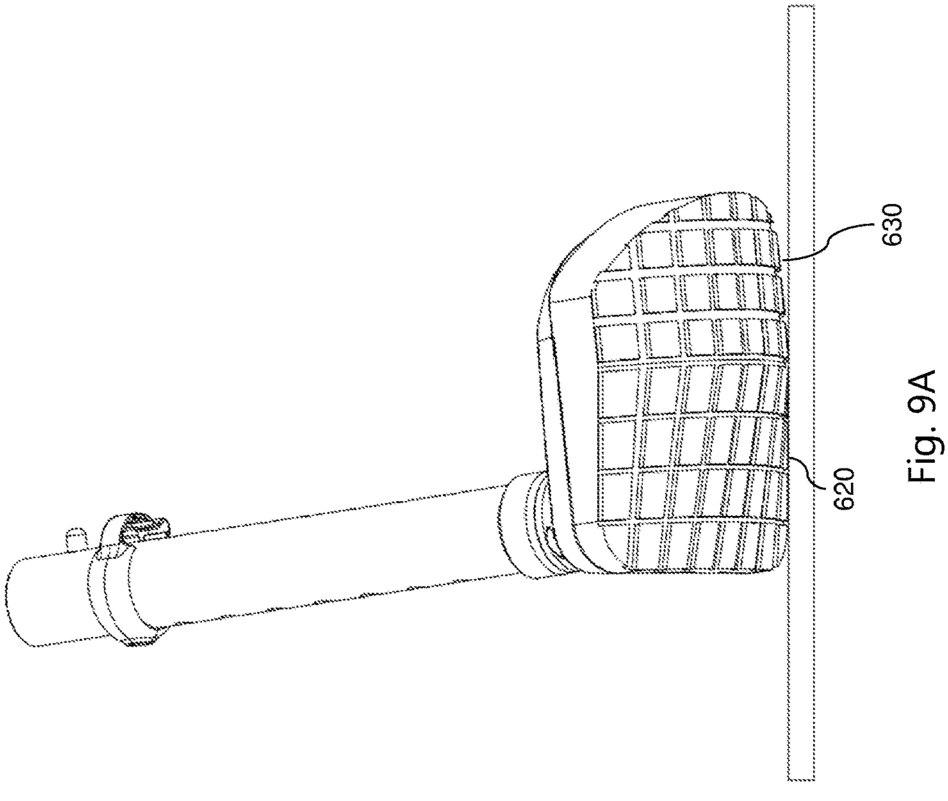
Figure 9C:
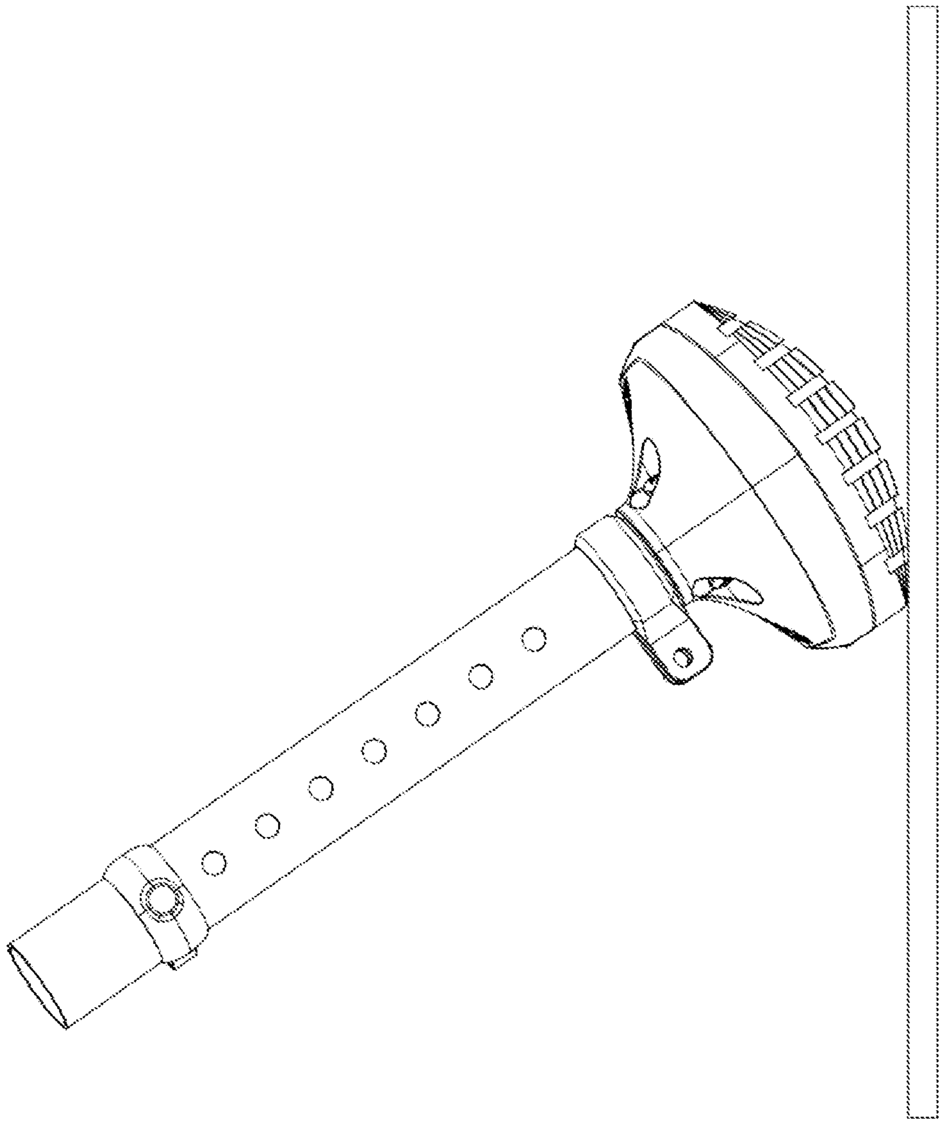
Figure 9D:
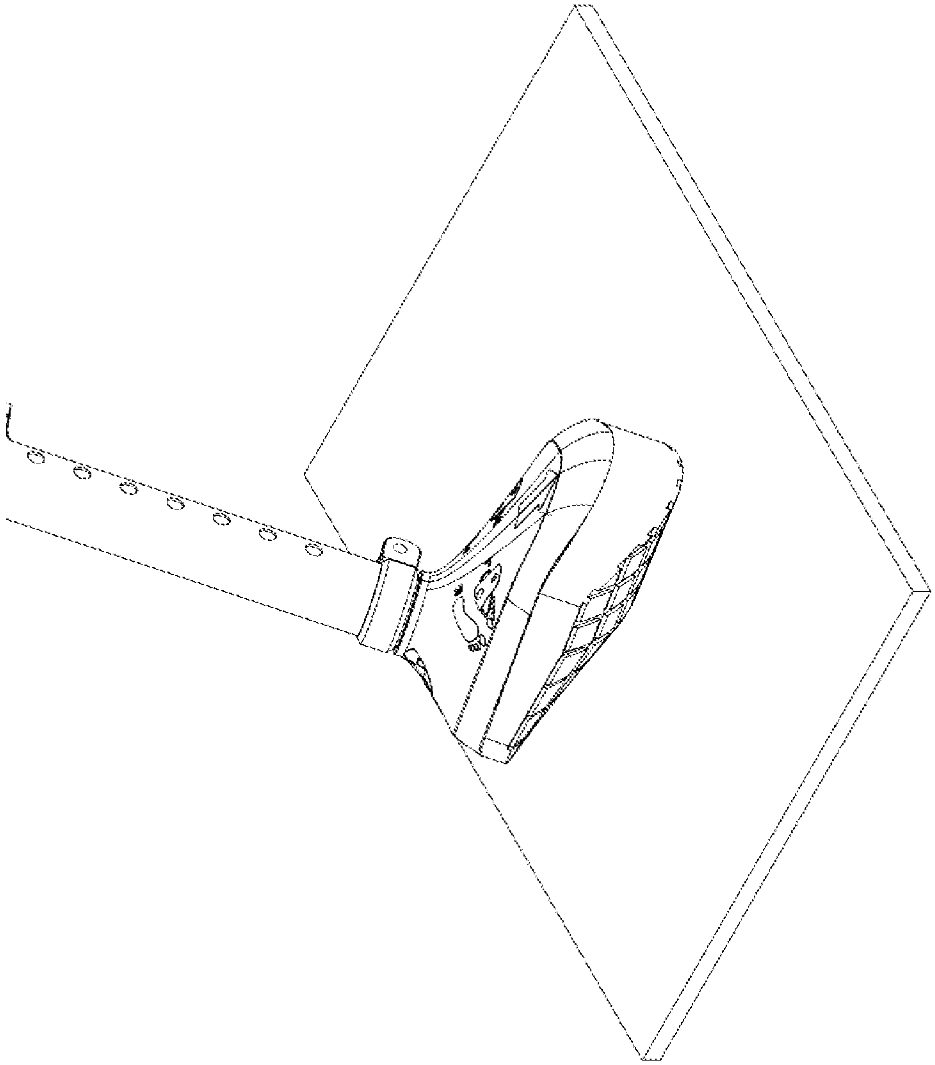
Figure 10B:
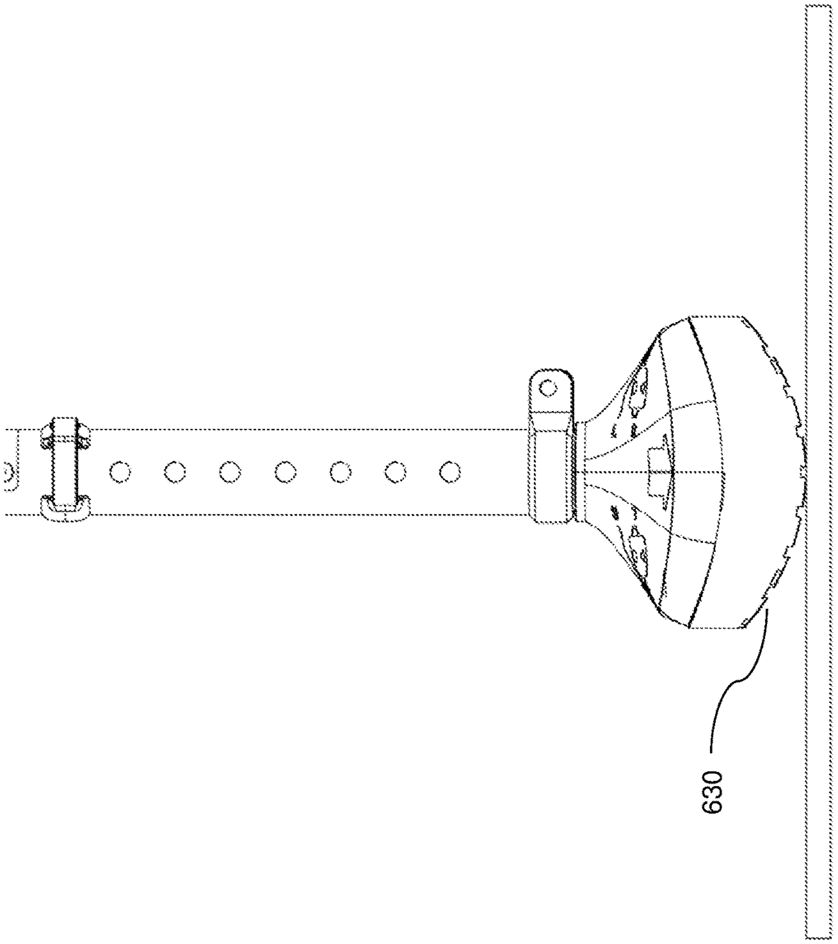
FIGS. 10A-10D illustrate rear, outer side, inner side and perspective views, respectfully, of a mid-stride point of a step of the foot of FIG. 6, where outer section is contacting the ground.
Figure 10A:
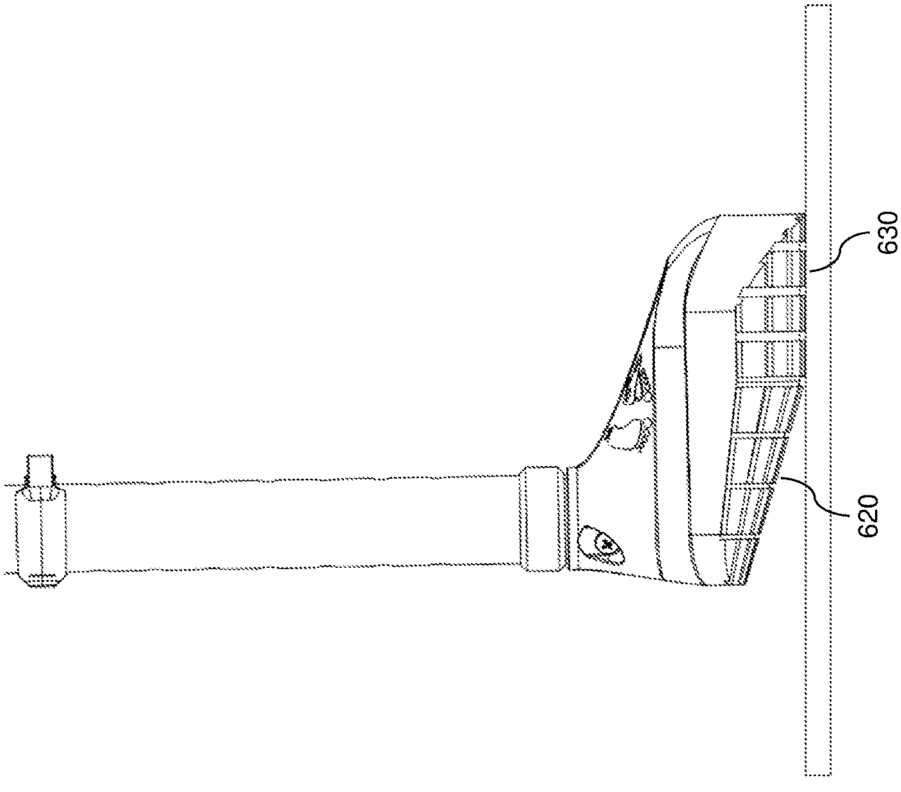
Figure 10C:
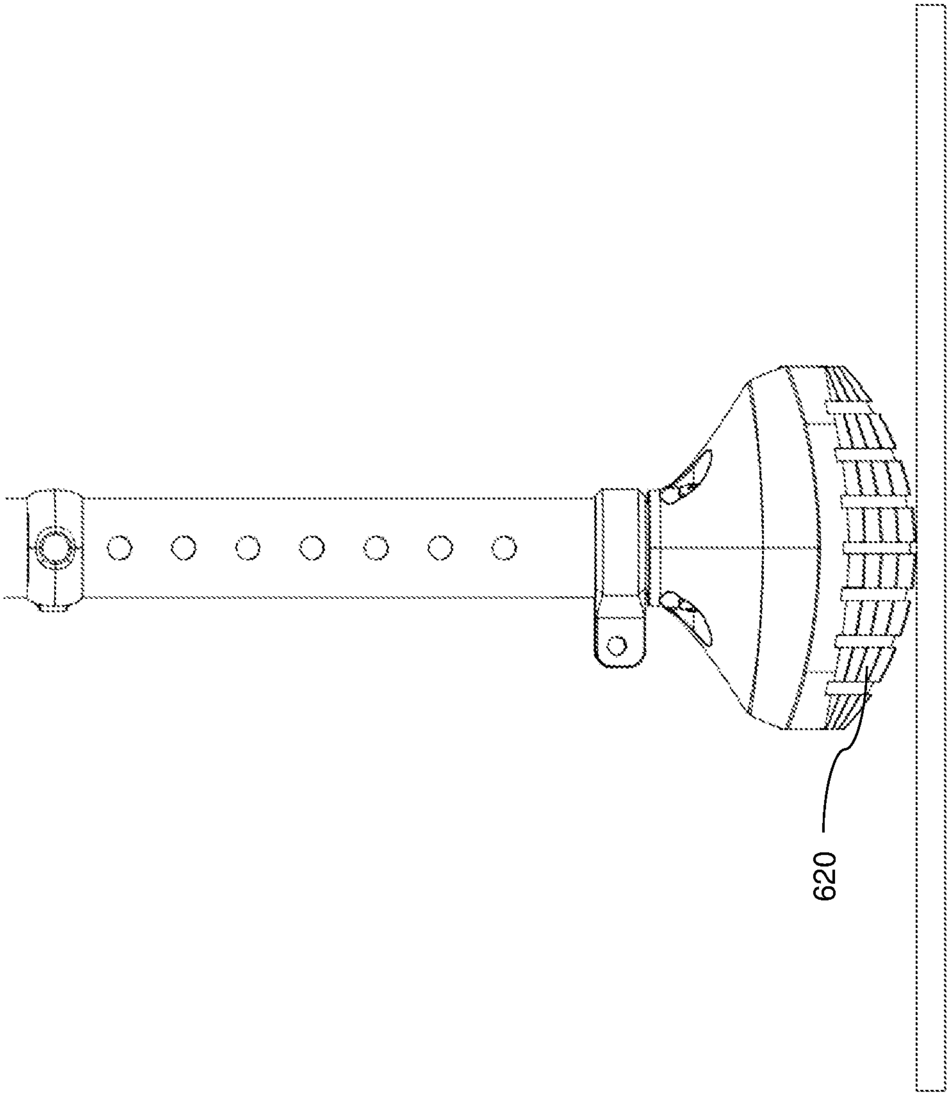
Figure 10D:
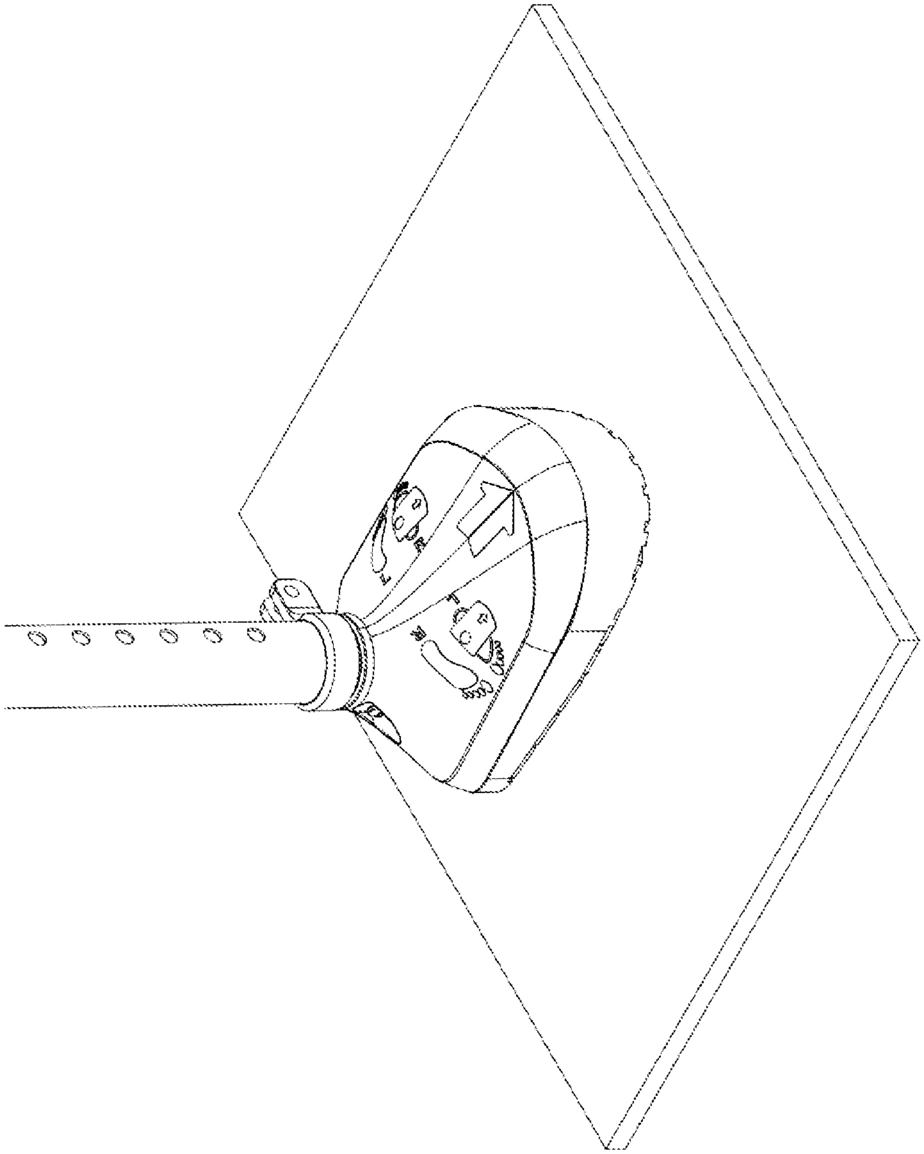

FIGS. 8A-8D illustrate rear, outer side, inner side and perspective views, respectively, of the heel-strike point of the step where the inner section 620 is used to contact the ground. Likewise, FIGS. 9A-9D illustrate the rear, outer side, inner side and perspective views, respectively, of the toe-off point of this same step that uses inner section 620 to contact the ground. As with FIG. 7A, FIGS. 8A and 9A show that at each part of the step when inner section 620 is used to contact the ground, outer section 630 does not come into contact with the ground.

When a user loses lateral stability, outer section 630 becomes engaged by coming into contact with the ground, thus restoring the user's stability. FIGS. 10A-10D illustrate rear, outer side, inner side and perspective views, respectfully, of a mid-stride point of a step where outer section 630 is contacting the ground.

The difference in camber between the inner section 620 and outer section 630 allows for a new user to learn to walk with a hands-free crutch more efficiently and in greater safety by providing an inner section 620 that that is equivalent to a narrow foot, with its inherent advantages, while having the stability reserve of outer section 630 available in the event that the user has a laterally off-balance situation. The independent cambers also mean that a new user can learn to use a traditional hands-free crutch without becoming dependent on an additional training surface.

It should be noted that while the foot 600 of FIGS. 6-10D can use the variable camber ground contact surface of FIGS. 1-5 for either the inner section 620, the outer section 630, or both, it is not required to do so. The inventive subject matter of the foot 600 can also be used for traditionally-cambered ground contact surfaces for inner section 620 and/or the outer section 630 as long as there is a difference in camber between the inner section 620 and outer section 630 to provide for the functionality discussed above.

In embodiments of the inventive subject matter, the benefits of a variable camber can be obtained even when a foot having a constant camber is used. In these embodiments, a pivoting element 1100 is used that provides the variable camber effect to the crutch and the user. This embodiment is seen in FIGS. 11A-13C.

The pivoting element 1100 includes a hinge 1110 attached to the foot 1120 that fits into a corresponding hole 1130 in the tube block 1140. These elements are shown in a close-up view in FIG. 12D. As the person performs a step with the crutch while walking, the tube block 1140 will rotate relative to the hinge 1110.

The effect of the angle changing as the tube block 1140 pivots relative to the hinge 1110 is achieved by an angle difference between the tube block 1140 and the hinge 1110. This angle difference is seen in the dotted lines of FIG. 12D, where the hinge 1110 does not sit parallel to either the ground or the top and bottom of the tube block 1140. This angle difference will cause the tube block 1140 to sweep out in an arc (rather than completely circular) as the tube block 1140 rotates about the hinge 1110.

Both of the angle differences (the angle difference between the tube block 1140 and the hinge 1110 as well as between the hinge 1110 and the bottom of the foot) are used to cause a change in the off-vertical angle of the post 1150 as the person "rolls over" the foot 1120 while the foot 1120 sits flat on the ground.

Figures 11A, 11B, 11C:
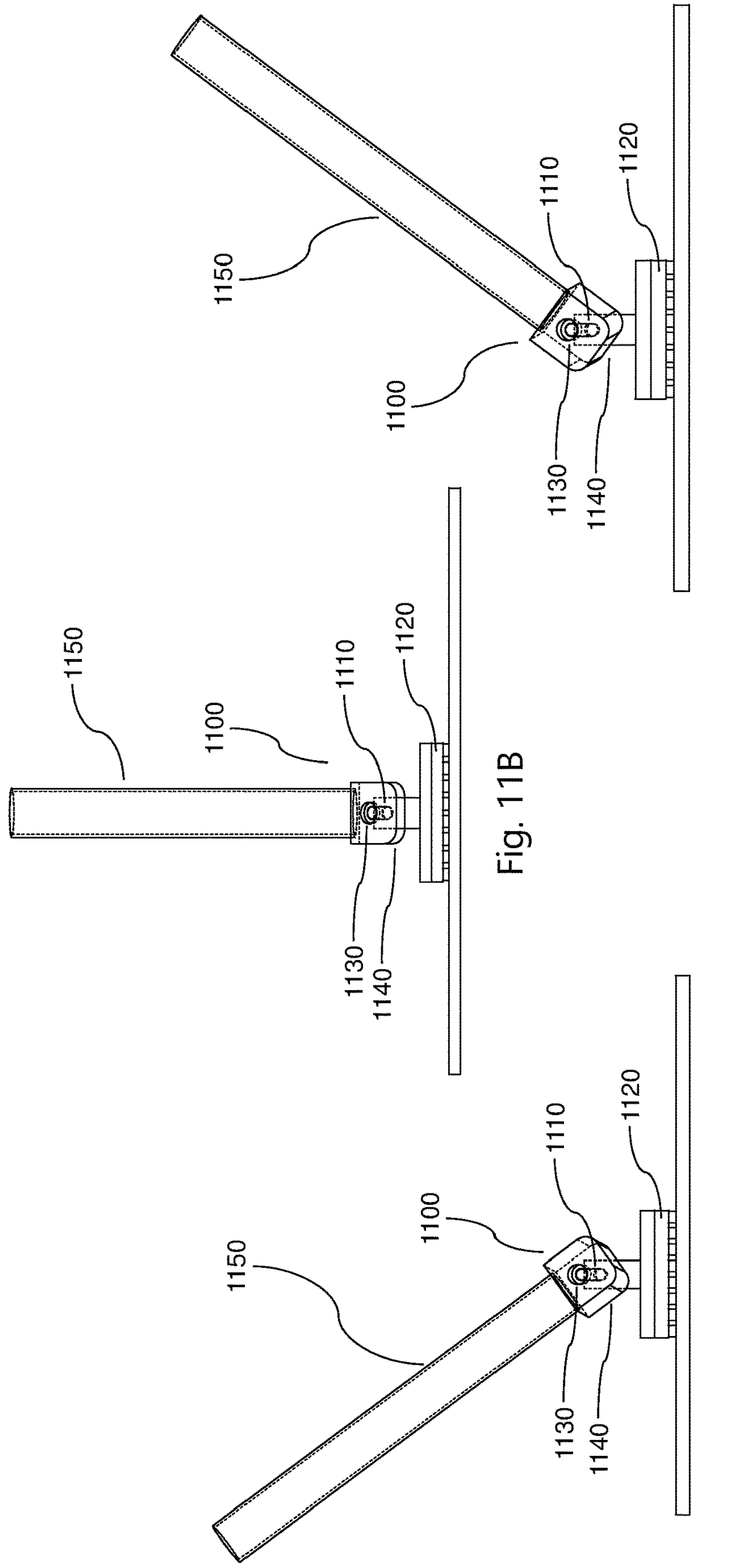
FIGS. 11A-11C show a side view of the step process of a foot having a pivoting elements, showing the heel strike, the mid-stance portion of the step, and the toe-off portion, respectively.

FIGS. 11A-11C show a side view of the step process—the heel strike, the mid-stance portion of the step, and then the toe-off portion, respectively. In this example, the crutch illustrated is one used on the right leg of a user.

Figure 12C:
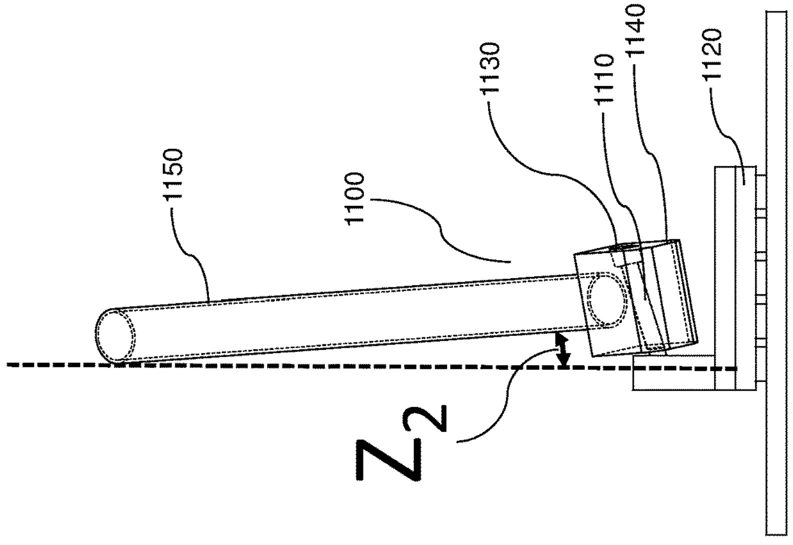
FIGS. 12A-12C illustrate a rear view of the parts of the step shown in FIGS. 11A-11C.
Figure 12B:
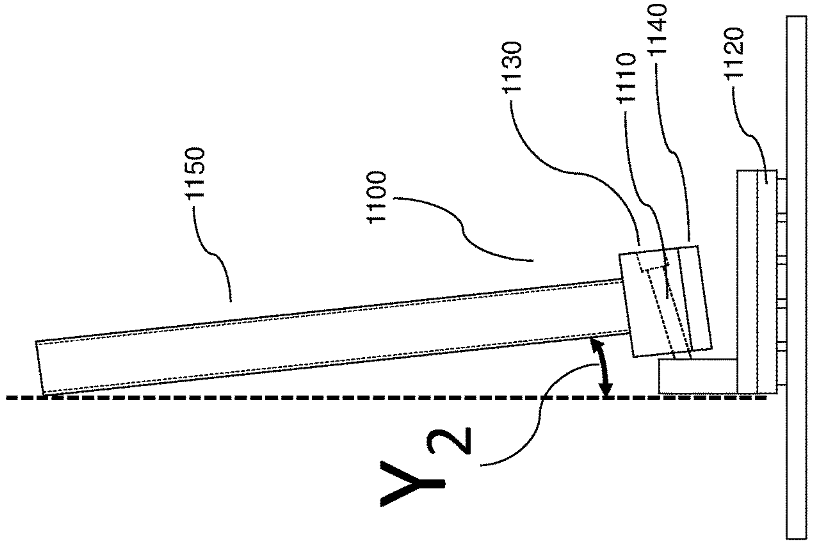
Figure 12A:
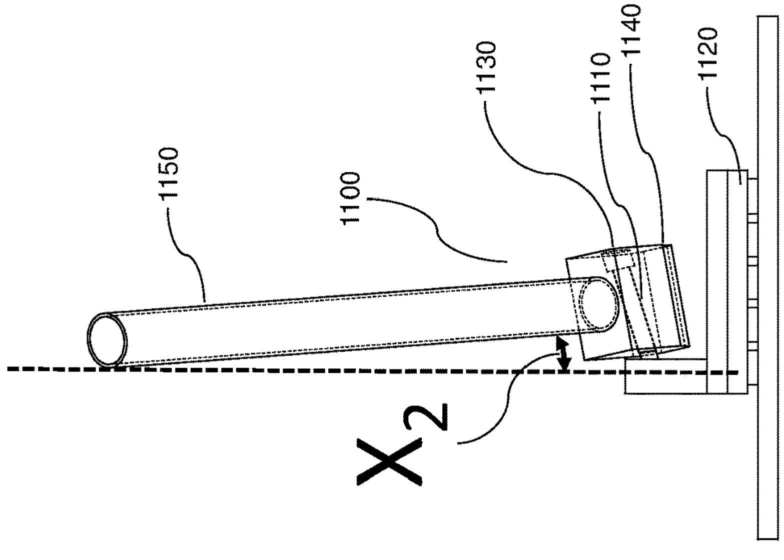
Figure 12D:
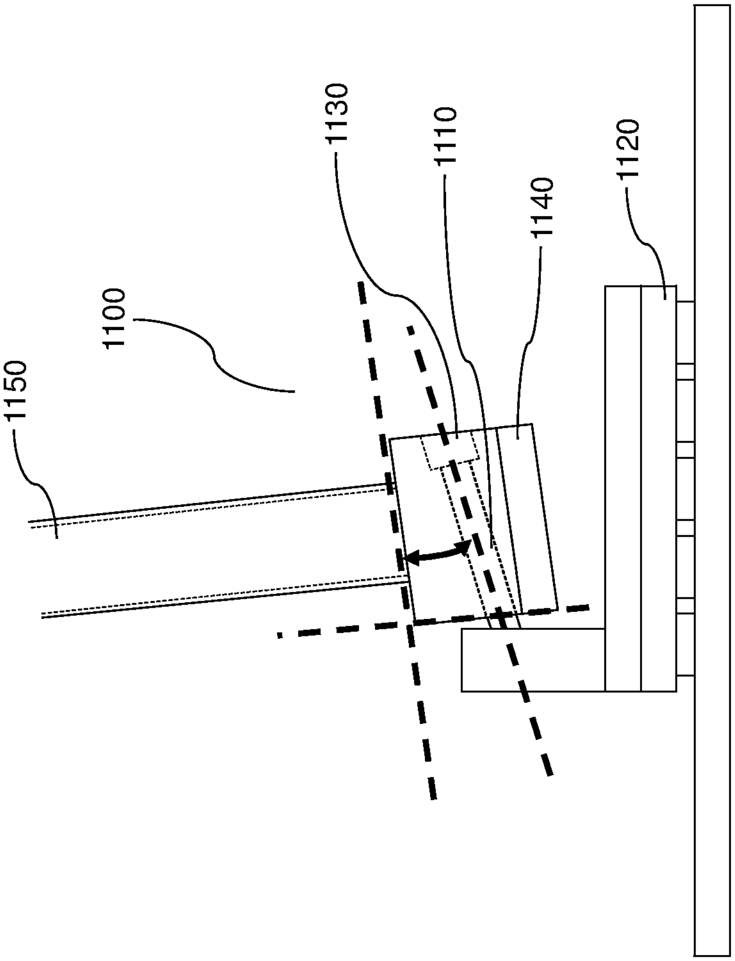
FIG. 12D shows a close-up view of the foot of FIGS. 11A-12C, illustrating the difference in angles.

FIGS. 12A-12C illustrate a rear view of the parts of the step shown in FIGS. 11A-11C. From this perspective, the difference in the angle as the user progresses from the heel strike (FIG. 12A) through the mid-stance (FIG. 12B) and then to the toe-off (FIG. 12C) is clearly visible. At the heel strike, the angle $X_2$ will be smaller than the angle $Y_2$ at the mid-stance. Likewise, the angle $Z_2$ at the toe-off point will be smaller than the mid-stance angle $Y_2$. Depending on the needs of a particular user the angles $X_2$ and $Z_2$ can be the same, but do not have to be.

Figure 13C:
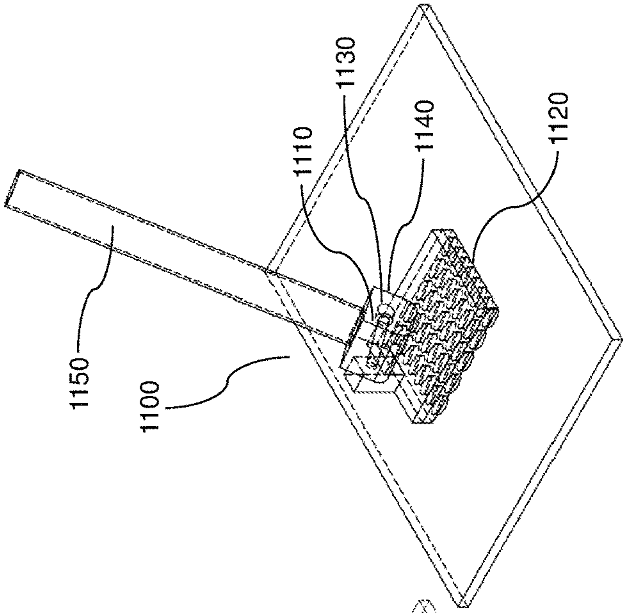
FIGS. 13A-13C show a perspective view of the step illustrated in FIGS. 11A-11C and FIGS. 12A-12C.
Figure 13B:
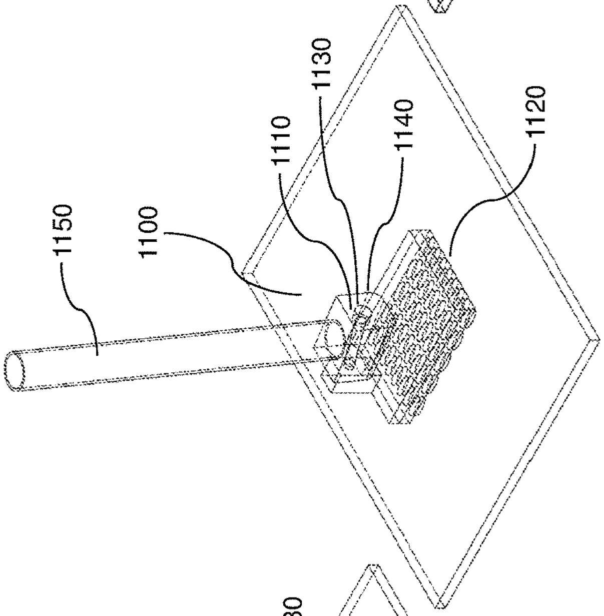
Figure 13A:
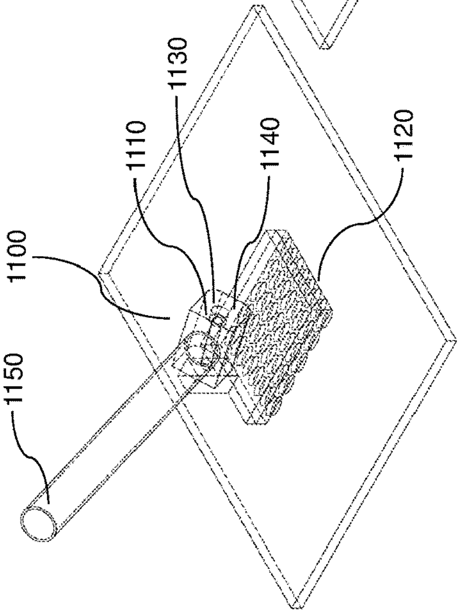

FIGS. 13A-13C show a perspective view of the step illustrated in FIGS. 11A-11C and FIGS. 12A-12C.

An advantage of the embodiment of FIGS. 11A-13C is that the entirety of the foot 1120 will be in contact with the ground through the majority of the step process. This way, the user will have increased stability and reduces the chance of a slip while planting the foot 1120 during the heel strike portion or pushing off from the foot 1120 during the toe-off portion.

In embodiments of the inventive subject matter, the benefit of the variable camber can be achieved via a tread having variable compressibility between the area of maximum camber and the area(s) of lower camber (e.g., the toe and/or heel). In some of these embodiments, the variable compressibility can be achieved via one or more materials having different or changing durometer to achieve the different cambers. As used herein, "durometer" can be considered to be the resistance to compression of the material. Thus, a higher durometer would be harder to compress (require more force to compress) whereas a lower durometer would be easier to compress (require less force to compress).

FIGS. 14A-14I illustrate a crutch having a tread 1400 with a durometer that changes from a relatively stiff section in the middle of the foot and gets gradually softer as it gets closer to each of the front of the foot and the back of the foot. Thus, when the weight of the user is in the middle of the foot, the tread remains largely uncompressed and thus the vertical post remains at an off-vertical position at the angle of camber of the tread. However, at the heel strike and/toe-off position, the tread compresses such that the foot is flat, and the post at smaller angle than at when at the mid-stance position.

Figures 14A, 14B, 14C:
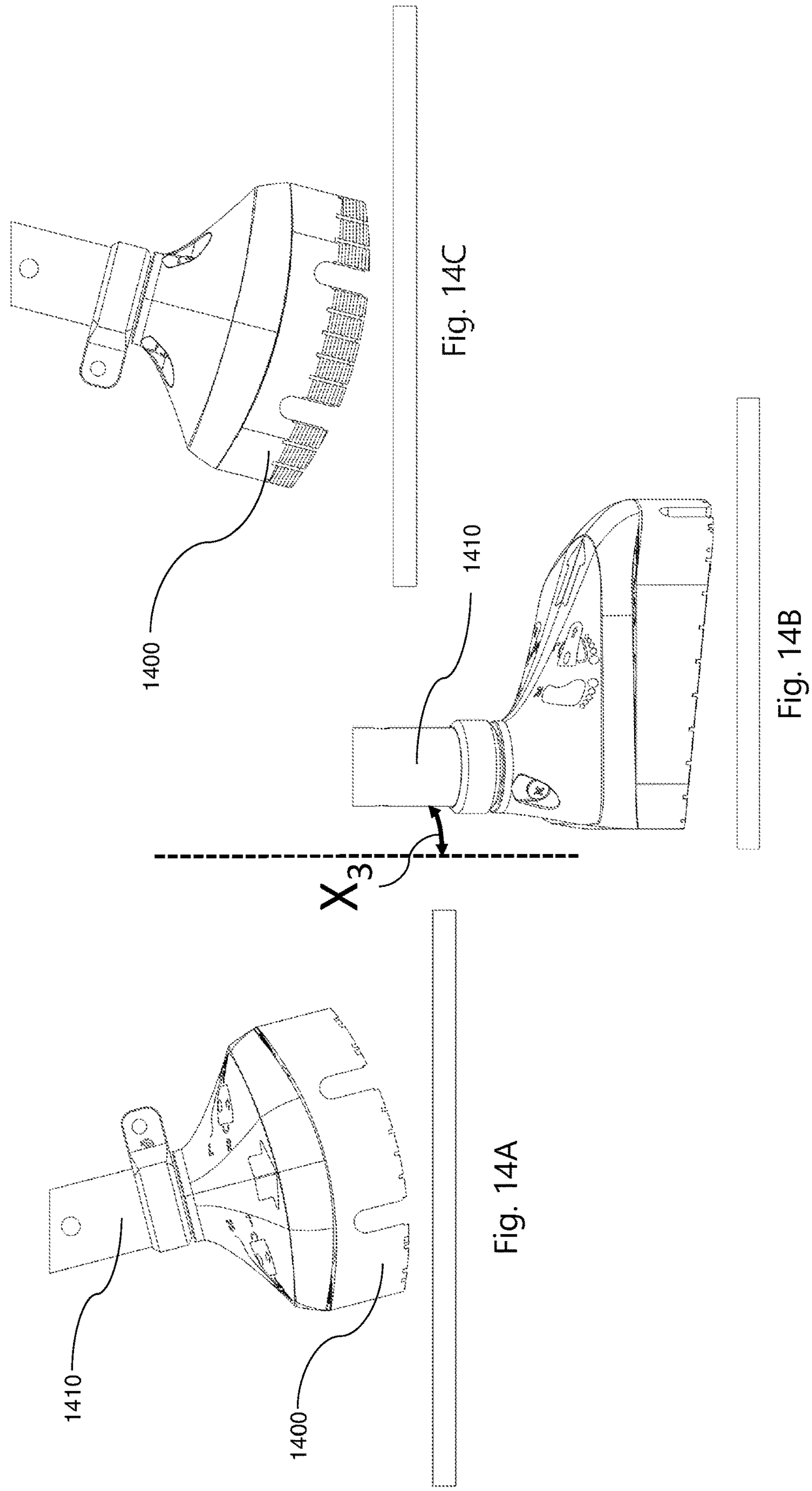
FIGS. 14A-14C show lateral, rear and medial views, respectively, of a foot having a tread with a variable durometer prior to the heel strike, according to embodiments of the inventive subject matter.

FIGS. 14A-14C show lateral, rear and medial views, respectively, of a foot having the tread 1400 prior to the heel strike. Prior to the heel strike, the pylon/post 1410 will be at an angle $X_3$ that will be a vertical or nearly-vertical orientation. The at-rest shape of the tread 1400 is visible as angled relative to the ground.

Figure 14E:
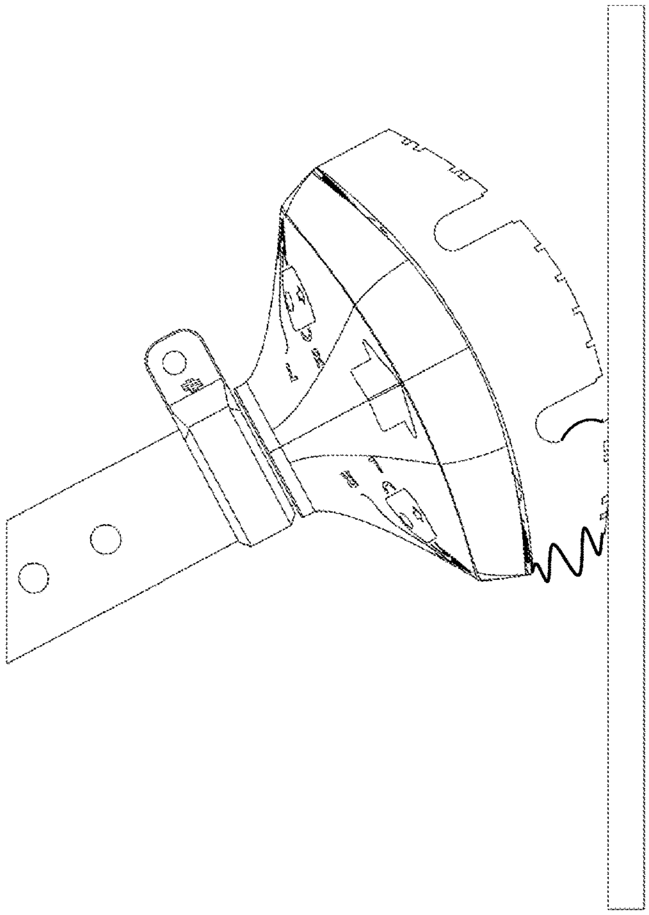
FIGS. 14D-14E show how the soft durometer section of the tread in the heel strike region compresses when loaded.
Figure 14D:
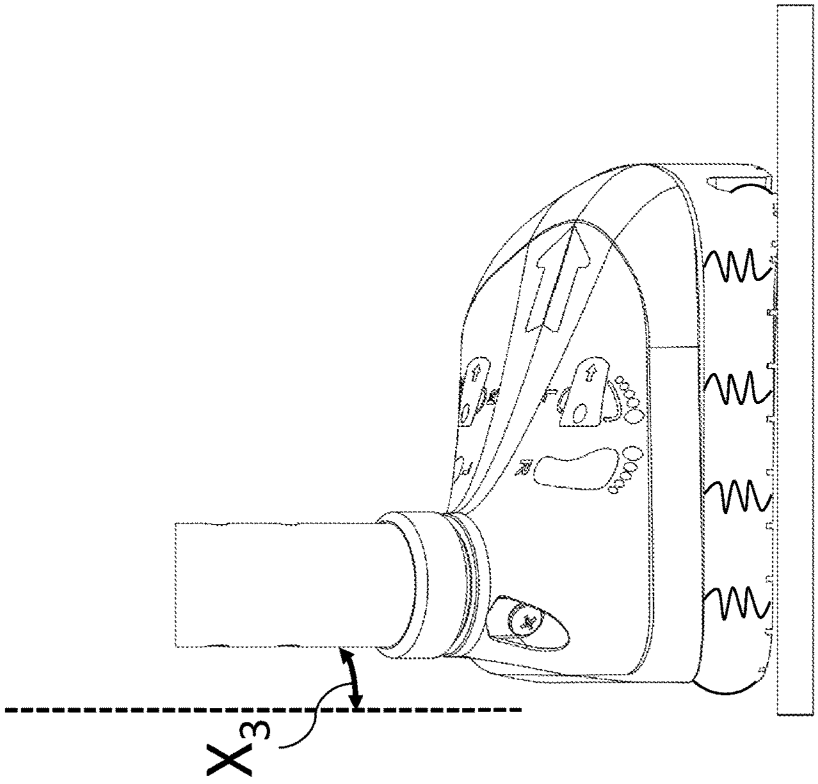

FIGS. 14D-14E show how the soft durometer section of the tread in the heel strike region compresses when loaded such that the tread 1400 takes the shape of the rigid material of the foot above the tread. This allows the pylon 1410 to stay relatively vertical at the heel strike stage, which results in a more comfortable "ground acceptance" phase for the user at the heel strike stage and a gentle transition towards the mid-stance portion as the foot rolls forward.

Figure 14F:
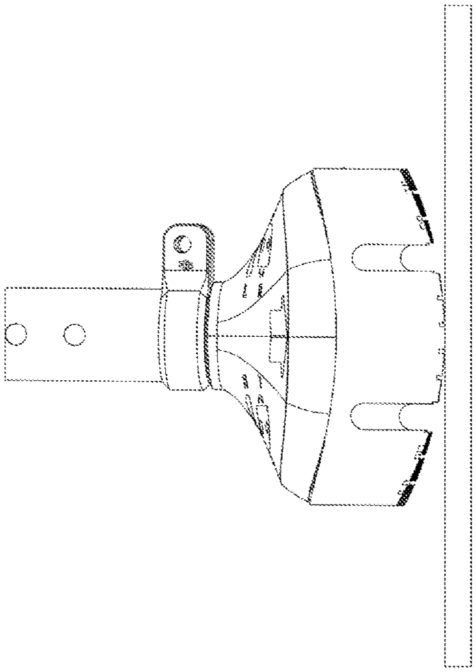
FIGS. 14F-14H show the foot at the lateral, rear and medial views, respectively, during the mid-stance portion.
Figure 14G:
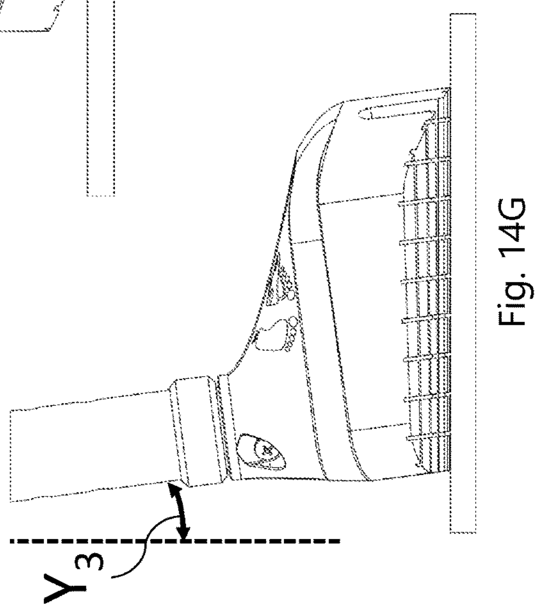
Figure 14H:
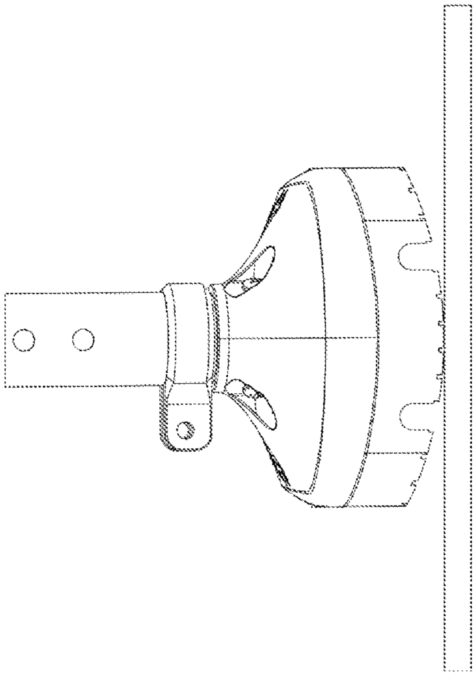

FIGS. 14F-14H show the foot at the lateral, rear and medial views, respectively, during the mid-stance portion. At this stage, the relatively stiffer (higher durometer) section of the tread 1400 in the middle remains largely uncompressed when loaded and imparts a centering force to the user by effectively "pushing" the pylon 1410 off vertical towards the medial side, resulting in an off-vertical angle $Y_3$. Thus, the true camber of the tread 1400 would be effected onto the user.

The toe-off portion would mirror the heel-strike sections of FIGS. 14D-14E, where the compressibility is such that the pylon 1410 would be at an angle that is smaller than the angle $Y_3$ of the mid-stance stage. However, it should be noted that the angle at the toe-off can be, but is not required to be, the same as the angle during the heel strike section.

Figure 14I:
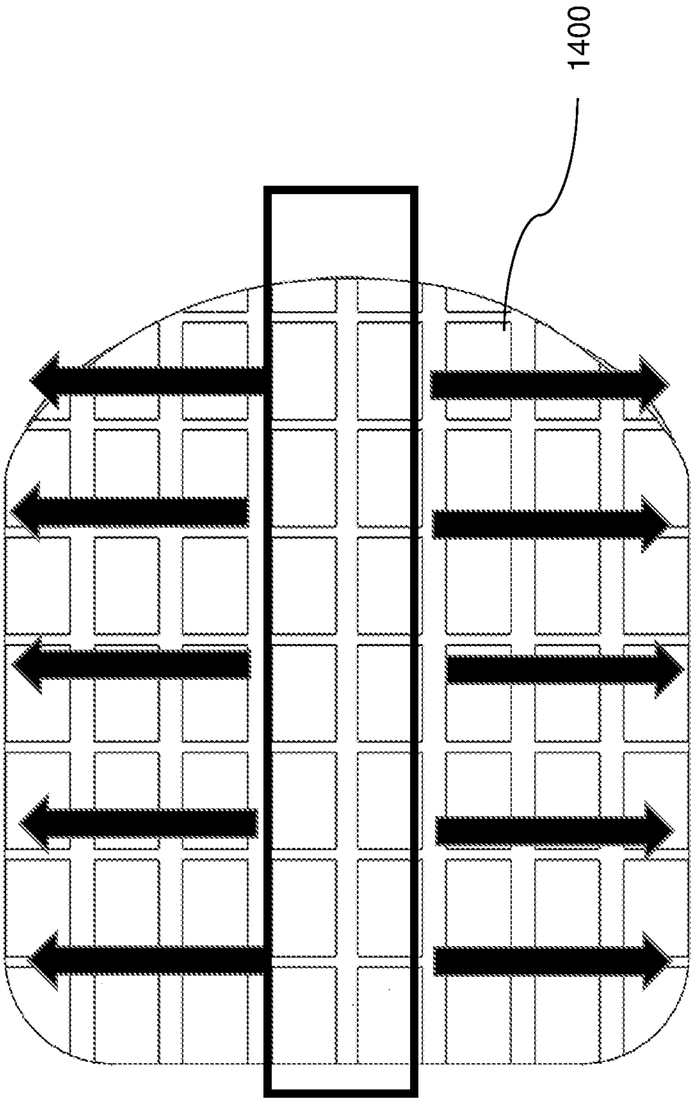
FIG. 14I provides an illustration of the underside of tread 1400, illustrating how the durometer changes.

FIG. 14I provides an illustration of the underside of tread 1400, illustrating how the durometer changes. The central portion (generally denoted by the box) is the mid-stance area that has the highest durometer (i.e., is the stiffest against compression). As the tread approaches the front end (the toe-off portion) and the rear end (the heel strike portion) from this central portion, the durometer gradually reduces. The direction of this gradual reduction is illustrated by the direction of the arrows.

The embodiments of FIGS. 14A-14I illustrate three separate sections of the tread 1400 with gaps in between the sections. The gaps are for illustrative purposes, and can be incorporated in embodiments of the inventive subject matter and not incorporated in other embodiments of the inventive subject matter. In these embodiments, each of the separate sections can be a material with a different durometer/compressibility. The material can be the same material with different durometer/compressibility (e.g., a rubber or plastic) at each section, or can be different materials (some sections can be rubber, others a harder plastic, etc.). Additionally, in embodiments, the durometer/compressibility of the material in each section can vary such that the compressibility of the tread 1400 is gradually changing even within the different sections of the tread 1400. In other embodiments, each section can be of a single durometer/compressibility, and the effect of variable camber achieved by having multiple sections across the length of the foot. In the embodiment of FIGS. 14A-14I, only three sections are shown, but it is contemplated that the tread can be made up of many sections having different durometer/compressibility such that the effect of a gradual compressibility change across the length of the tread (toward and away from a section of maximum camber) can be achieved.

In embodiments of the inventive subject matter, the variable compressibility can be achieved via gaps, holes or spaces disposed within the tread 1400. In sections where greater compressibility is desired, the amount of the holes within the tread 1400 will be increased (i.e., a greater hole density). Where lower compressibility is desired, such as the area of maximum camber, the hole density is lower. In the sections of maximum camber, the number of holes can be zero.

Other ways to obtain variable compressibility can be used in embodiments of the inventive subject matter. For example, varying the wall thickness of the material of the tread 1400 can result in varying compressibility.

The exact durometer used at each of the sections of the tread can be selected based on factors such as the weight of the intended user and the desired camber angles at each section. In each case, the durometer at the heel edge and/or toe edge will be selected to compress more than at the maximum camber angle portion. At the maximum camber angle portion(s), the durometer is sufficiently high such that there is almost no compression of the tread when the user's weight is applied.

It will be appreciated that a benefit of these embodiments is that the compressing tread also affords a degree of shock absorption at the heel strike, making the crutch more comfortable to use reducing the risk of injury to the user.

It will further be appreciated that another benefit of the embodiments with variable compressibility is that the tread can be made to have zero or near-zero camber angle and rocker angle when uncompressed, such that the crutch can remain standing while not in use (because the weight of the crutch by itself is not sufficient to compress the tread) but have the benefits of the variable camber during use (when the user's weight compresses the tread accordingly).

Figure 15B:
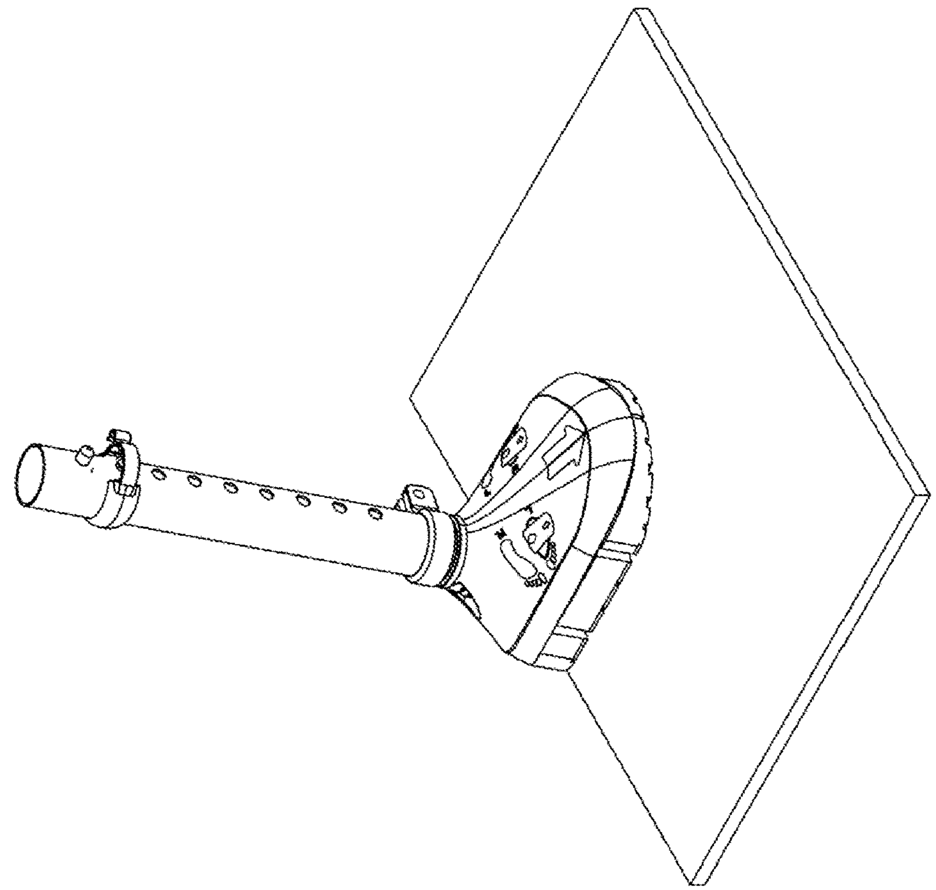
FIGS. 15A-15B illustrate an embodiment where the durometer changes from medial to lateral.
Figure 15A:
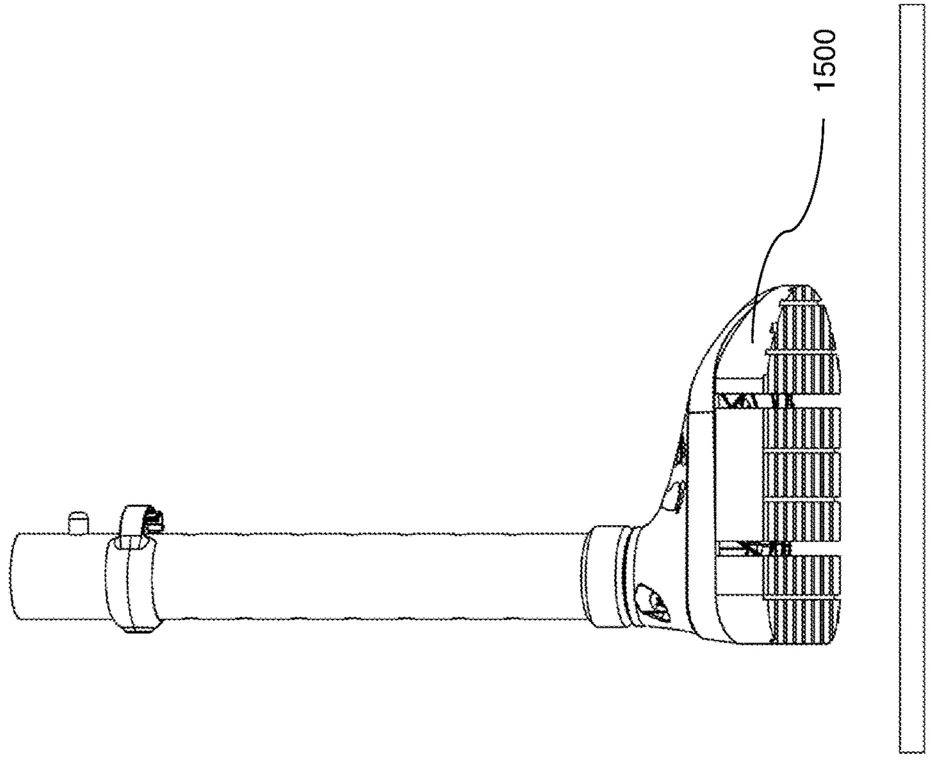

FIGS. 15A-15B illustrate an embodiment where the compressibility changes from medial (inner-most section, the left edge seen in FIG. 15A) to lateral (outer-most section, right side edge seen in FIG. 15A). In this example, the material(s) of the tread of the foot have varying and/or different durometers to achieve this desired effect. The example of FIG. 15A-15B show the tread 1500 of the foot when the foot is in the air (either after toe-off or prior to heel strike). As can be seen in FIG. 15A-15B, the at-rest underside of the tread 1500 is flat/parallel to the hardened material of the foot above the tread. Thus, the deformation of the tread under pressure as discussed below will cause the differences in camber angle as the user progresses through the step.

In this embodiment, the medial section has the lowest durometer (softest against compression), and the durometer increases in the lateral direction. This is illustrated in FIG. 15C.

Figure 15C:
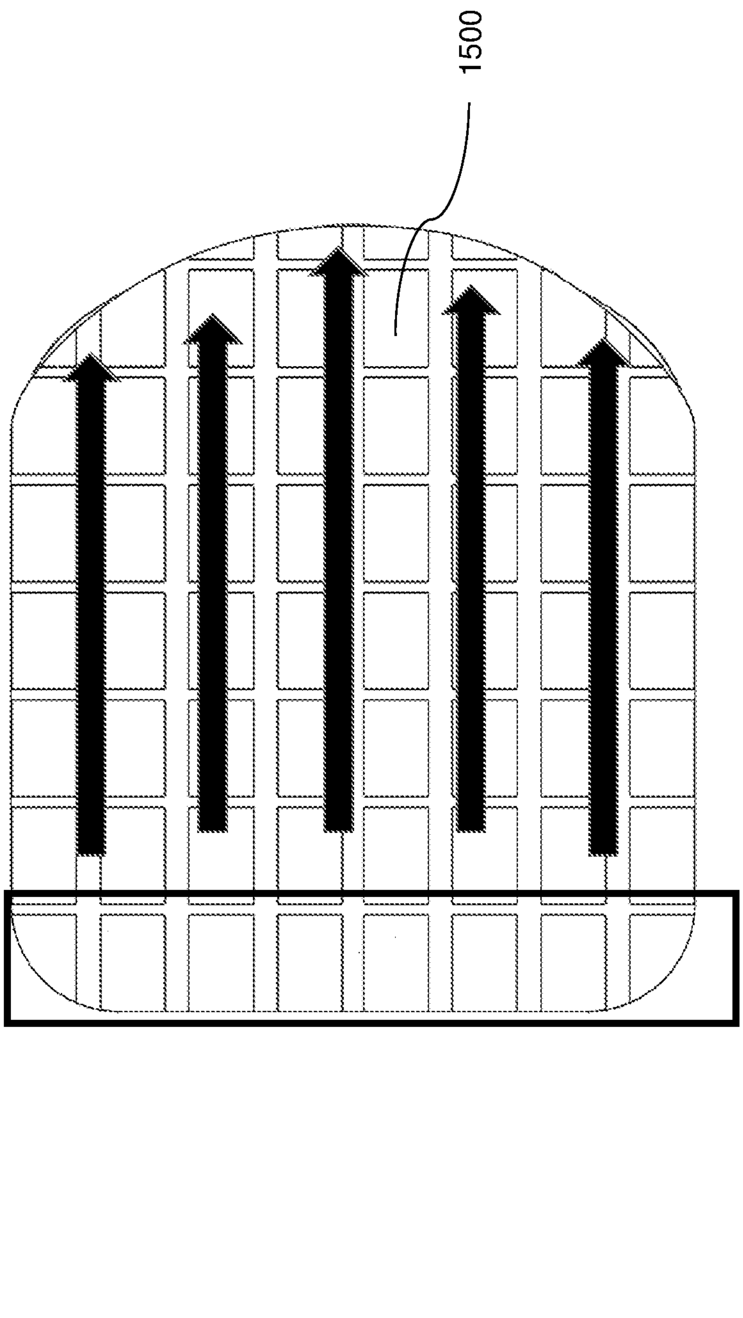
FIG. 15C illustrates the increasing durometer in the lateral direction.

In FIG. 15C, the box illustrates the area where the durometer is the lowest. The arrows illustrate the direction of the increasing durometer. The rounded lateral shape of the tread 1500 will result in a stiffer durometer around the edge of the center section than at the toe-off or the heel strike sections because there is a longer distance from the medial to the lateral and as such, more room for the durometer to gradually increase. This resulting increased stiffness at the central portion will result in the changes of the angles of the pylon such that the largest off-vertical angle of the pylon will be at the central portion.

It is contemplated that the embodiments of FIGS. 7A-10D can be applied with or used in combination with the other embodiments discussed herein such that a novice user can become proficient in walking with the crutches of the various embodiments discussed herein.

In some embodiments, the numbers expressing quantities of ingredients, properties such as concentration, reaction conditions, and so forth, used to describe and claim certain embodiments of the invention are to be understood as being modified in some instances by the term “about.” Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of “a,” “an,” and “the” includes plural reference unless the context clearly dictates otherwise. Also, as used in the description herein, the meaning of “in” includes “in” and “on” unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term “coupled to” is intended to include both direct coupling (in which two elements that are coupled to each other contact each other) and indirect coupling (in which at least one additional element is located between the two elements). Therefore, the terms “coupled to” and “coupled with” are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms “comprises” and “comprising” should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A crutch comprising:

a lower leg platform coupled to a frame, the lower leg platform configured to support a lower leg of a user; and a foot coupled to the frame, the foot comprising a ground contact region having a first portion having a first camber angle and a second portion having a second camber angle, wherein the first camber angle is less than the second camber angle, wherein the first portion is a rear portion of the ground contacting region and the second portion is forward of the first portion.

2. The crutch of claim 1, further comprising wherein the first portion is a front portion of the ground contact region and the second portion is rearward of the first portion.

3. The crutch of claim 2, wherein the front portion comprises a toe-off portion.

4. The crutch of claim 2, wherein the second portion is a midpoint of the ground contact region.

5. The crutch of claim 1, the foot further comprising a third region at the rear region having a third camber angle and wherein the third camber angle is less than the second camber angle.

6. The crutch of claim 5, wherein the rear region comprises a heel strike region.

7. The crutch of claim 5, wherein the third camber angle is equal to the first camber angle.

8. The crutch of claim 1, wherein the rear portion comprises a heel-strike region.

9. The crutch of claim 1, the foot further comprising a third region at the front region having a third camber angle and wherein the third camber angle is less than the second camber angle.

10. The crutch of claim 9, wherein the front region comprises a toe-off region.

11. The crutch of claim 1, wherein the first camber angle is zero.

12. The crutch of claim 1, wherein:

the vertex of the first camber angle is medial of the lateral edge of the first portion; and the vertex of the second camber angle is medial of the lateral edge of the second portion.

* * * * *